US012792622B1

(12) United States Patent
Ramesh et al.

(10) Patent No.: US 12,792,622 B1
(45) Date of Patent: Nov. 10, 2026

(54) QUERYING STRUCTURED AND UNSTRUCTURED DATA UTILIZING HYBRID NATURAL LANGUAGE QUERIES WITH SEMANTIC FILTERING

(71) Applicant: Adobe Inc., San Jose, CA (US)

(72) Inventors: Siddarth Ramesh, Noida (IN); Piyush Gupta, Noida (IN); Nikaash Puri, New Delhi (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 19/333,970

(22) Filed: Sep. 19, 2025

(51) Int. Cl.
*G06F 16/2458* (2019.01)
*G06F 16/248* (2019.01)

(52) U.S. Cl.
CPC ........ *G06F 16/2471* (2019.01); *G06F 16/248* (2019.01)

(58) Field of Classification Search
None
See application file for complete search history.

(56) References Cited

U.S. PATENT DOCUMENTS

2014/0040306 A1* 2/2014 Gluzman Peregrine ..................... G06F 16/2477 707/769
2017/0329872 A1* 11/2017 Dispensa .......... G06F 16/24522
2021/0064642 A1* 3/2021 Qian .................. G06F 16/3329
2026/0119585 A1* 4/2026 Darmour ............... G06F 16/248

* cited by examiner

*Primary Examiner* — Eddy Cheung
(74) *Attorney, Agent, or Firm* — Keller Preece PLLC

(57) ABSTRACT

The present disclosure relates to systems, non-transitory computer-readable media, and methods for utilizing a hybrid query to generate a summary of requested data from a composite database. The disclosed systems receive a prompt requesting data from a composite database including structured data sources and unstructured data sources. The disclosed systems generate a hybrid query comprising one or more structured subqueries and one or more unstructured semantic subqueries. The disclosed systems determine an initial subset of data by executing the structured subqueries on the structured data sources. The disclosed systems determine an actionable subset of data from the initial subset of data by utilizing a set of semantic filters to analyze unstructured data sources of the initial subset of data according to the unstructured semantic subqueries. The disclosed systems utilize a large language model to analyze the actionable subset of data to generate a summary of the requested data for display.

20 Claims, 13 Drawing Sheets

QUERYING STRUCTURED AND UNSTRUCTURED DATA UTILIZING HYBRID NATURAL LANGUAGE QUERIES WITH SEMANTIC FILTERING

BACKGROUND

Advancements to the capabilities of machine learning models have increased their prevalence for performing tasks such as retrieving and summarizing data. Existing systems, however, have a number of problems or inadequacies in relation to flexibility, efficiency, and accuracy. For instance, conventional systems are generally inflexible in the type of data they are able to process. To illustrate, existing systems typically are able to process and summarize either structured data or unstructured data. For example, structured query language systems work well on structured data but are unable to handle free-text fields. Along related lines, semantic search systems are able to retrieve relevant text using embeddings but are typically unable to apply structured filters or logic. Large language model (LLM) based retrieval-augmented generation systems are able to retrieve relevant text over combined data but lack precision, consistency, and require extensive processing power.

Additionally, conventional systems are inefficient. For example, conventional systems when analyzing unstructured data, typically require the large language model to process the entirety of the unstructured data, vastly increasing the processing power and computing resources necessary to retrieve and then generate a summary of relevant unstructured data. Further, generating prompts to identify specific semantic cues such as urgency, product launches, or call-to-action prompts often requires specific prompt tuning and data augmentation, requiring additional prompting and data processing to generate data summaries from both structured and unstructured data.

Further, conventional systems are inaccurate. For example, conventional systems often fail to interpret the nuance included in unstructured text, failing to retrieve relevant information in response to a prompt. For instance, conventional systems fail to interpret nuanced expression that convey a specific meaning without aligning perfectly with a specific format. As an example, a conventional system, in response to a prompt to retrieve information about urgent ad campaigns, may fail to retrieve ads with the language “Limited Time Offer” as such language does not include language such as “Urgent” or “Act Now.” Further, conventional systems that utilize more nuanced natural language understanding (e.g., large language models), suffer from hallucinations and lack the precision needed for structured query generation.

SUMMARY

This disclosure describes one or more embodiments of systems, methods, and non-transitory computer readable media that solve one or more of the foregoing or other problems in the art with a hybrid query execution framework that supports efficient, precise querying across both structured and unstructured fields in a single pipeline. Specifically, the hybrid query execution framework extends the natural language to structured query language (NL2SQL) paradigm with semantic operators powered by lightweight transformer models and large language models (LLMs). The framework introduces two core primitives-ANSWER (text, question) for binary question/answer (QA) over unstructured fields and SUMMARY (text, prompt) for concise insights-allowing queries to seamlessly mix structured filters with semantic constraints. Thus, the hybrid query execution framework supports precise and efficient execution by incorporating semantic retrieval and fast binary QA filters, significantly reducing reliance on expensive LLM calls while preserving interpretability and accuracy. As a result, the hybrid query execution framework supports complex, intent-rich queries-such as filtering for recent campaigns about discounts or summarizing loyalty messaging-over millions of records with low latency and high precision.

BRIEF DESCRIPTION OF THE DRAWINGS

The disclosure describes one or more embodiments of the invention with additional specificity and detail by referencing the accompanying figures. The following paragraphs briefly describe those figures.

DETAILED DESCRIPTION

Figure 1:
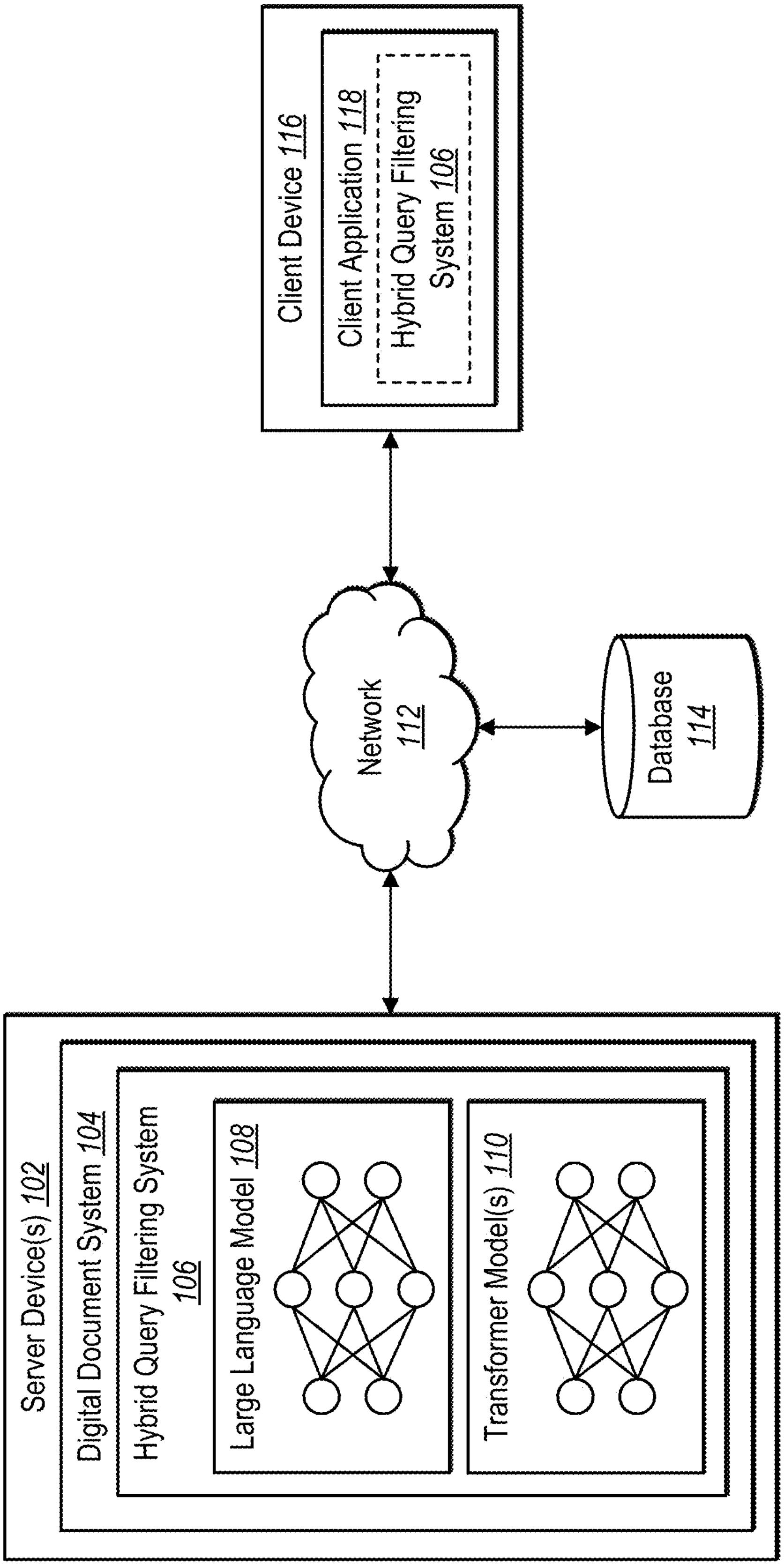
FIG. 1 illustrates a diagram of an environment in which a hybrid query filtering system operates in accordance with one or more embodiments.

This disclosure describes one or more embodiments of a hybrid query filtering system that utilizes a hybrid query execution framework to retrieve relevant data from a composite dataset and generate a response to a prompt utilizing the retrieved relevant data. For example, the hybrid query filtering system accesses a composite database including both structured and unstructured data sources and separates them into a structured data subset and an unstructured data subset. Further, in some embodiments, the hybrid query filtering system utilizes a hybrid query parser and one or more formatting filters to generate a hybrid query with structured and unstructured semantic subqueries from the prompt. In one or more embodiments, the hybrid query filtering system executes the structured subqueries on the structured data subset and leverages one or more semantic filters to execute the unstructured semantic subqueries on the unstructured data subset to generate an actionable subset of data. In some embodiments, the hybrid query filtering system utilizes a large language model to generate a response (e.g., a summary) to the prompt from the actionable subset of data.

As mentioned, in one or more embodiments, the hybrid query filtering system generates a structured data subset and an unstructured data subset. To illustrate, the hybrid query filtering system accesses a composite database that includes both structured data sources (e.g., data tables, charts, data objects) and unstructured data sources (e.g., natural language documents, emails). In one or more embodiments, the hybrid query filtering system generates a structured data subset that includes the structured data sources for analysis. In some embodiments, the hybrid query filtering system utilizes a transformer model to generate an unstructured data subset including the unstructured data sources for analysis.

In some embodiments, the hybrid query filtering system utilizes a hybrid query parser to generate a hybrid query from a prompt. For example, the hybrid query filtering system utilizes one or more formatting filters to determine data formatting (e.g., a data schema and/or an example hybrid query format) for a hybrid query. Further, in one or more embodiments, the hybrid query filtering system utilizes a hybrid query parser to generate one or more structured subqueries and one or more unstructured semantic subqueries to extract data from the structured subset of data and the unstructured subset of data, respectively.

In one or more embodiments, the hybrid query filtering system executes the structured subqueries and the unstructured semantic subqueries of the hybrid query. For instance, the hybrid query filtering system executes the structured subqueries to extract an initial subset of data relevant to the prompt from the structured subset of data. In one or more embodiments, the hybrid query filtering system leverages one or more semantic filters to filter information included within the initial subset of data according to the unstructured semantic subqueries and the unstructured data subset. In some embodiments, the hybrid query filtering system generates, in response to the one or more semantic filters, an actionable subset of data including relevant data from both the structured subset of data and the unstructured subset of data.

In some embodiments, the hybrid query filtering system utilizes a large language model to generate, from the actionable subset of data, a summary of the data requested in the prompt. In one or more embodiments, the hybrid query filtering system utilizes the large language model to generate a response to one or more complex subprompts within the hybrid query unresolvable by the structured subqueries and the semantic filters utilized for the unstructured semantic subqueries. Further, in some embodiments, the hybrid query filtering system generates the summary of the data requested in the prompt within a graphical user interface (GUI) in response to the client device prompt.

As suggested, in one or more embodiments, the hybrid query filtering system provides several advantages and benefits over existing systems. For example, some embodiments of the hybrid query filtering system improve flexibility, efficiency, and accuracy over prior systems. In some implementations, the hybrid query filtering system improves flexibility by utilizing a hybrid query execution framework that supports efficient, precise querying across both structured and unstructured fields in a single pipeline. For example, the hybrid query filtering system generates hybrid queries with both structured and unstructured semantic subqueries, which the hybrid query filtering system utilizes to extract relevant information from both structured data sources and unstructured data sources concurrently. Further, by leveraging both a structured subquery pipeline and an unstructured subquery pipeline, the hybrid query filtering system both effectively generates structured query language prompts while also providing nuanced natural language processing. Indeed, by generating both structured and unstructured semantic subqueries, the hybrid query filtering system allows querying of composite databases in a single run and by utilizing a single model. Additionally, by generating hybrid queries with both structured and unstructured semantic subqueries from a natural language prompt, the hybrid query filtering system empowers client devices to query composite datasets conversationally without requiring knowledge of database schemas or advanced structured query language prompting.

In one or more embodiments, the hybrid query filtering system also improves efficiency relative to conventional systems. For example, the hybrid query filtering system utilizes the large language model to process an actionable subset of data or complex subprompts rather than the entire dataset, vastly reducing the processing power and computing resources necessary given that the large language model is processing a comparatively small subset of data. The hybrid query filtering system does so by executing both structured subqueries and by leveraging one or more semantic filters to execute the unstructured semantic subqueries, extracting an actionable subset of data from the full dataset. By so doing, the hybrid query filtering system generates responses with low latency while maintaining high consistency, generating accurate responses in near real-time. Further, by utilizing semantic filters and a large language model, the hybrid query filtering system recognizes semantic cues and nuance, generating data summaries in a single call and from a composite database without requiring further data configuration.

Further, in one or more embodiments, the hybrid query filtering system improves accuracy relative to conventional systems. For example, by combining structured subqueries and unstructured semantic subqueries, the hybrid query filtering system accurately captures nuance within unstructured text while avoiding hallucinations. For example, by utilizing the structured subqueries to initially filter a composite dataset, the hybrid query filtering system avoids generating hallucinations by identifying a relevant subset of data. Further, by utilizing a model tuned for natural language understanding (e.g., a large language model), the hybrid query filtering system identifies information within the composite dataset with nuanced language corresponding to a prompt (e.g., identifying ads with the phrase "Limited Time Offer" as corresponding to an urgent ad campaign).

As illustrated by the foregoing discussion, the present disclosure utilizes a variety of terms to describe features and benefits of the hybrid query filtering system. Additional detail is hereafter provided regarding the meaning of these terms as used in this disclosure. For example, "structured data" refers to information that is organized according to a predefined data model or schema, enabling systematic storage, indexing, and retrieval by computational systems. Structured data may be stored or organized in tabular or relational formats, with entries conforming to a set of defined attributes (e.g., rows and columns in a database). Examples of structured data include numerical values, categorical entries, or text strings stored in relational databases, spreadsheets, or other schema-based repositories.

Along related lines, the term "unstructured data" refers to information that does not conform to a predefined data model, schema, or organizational framework, thereby lacking a consistent structure for storage in traditional relational databases. Such data may include free-form or heterogeneous content, where attributes and relationships are not explicitly defined in advance. Examples of unstructured data include natural language text, text documents, email bodies, images, audio files, video recordings, social media posts, and other multimedia content where the informational elements are not consistently organized into fields or records.

A "composite database" refers to a database storing both structured and unstructured data. A composite database is a form of computer storage (e.g., internal memory, an external database, a cloud-based distributed storage database) that stores both structured data (e.g., data tables, charts, data objects) and unstructured data (e.g., natural language documents, emails).

In some cases, a "hybrid query" refers to a computer executable query that includes one or more of structured and unstructured semantic subqueries. In particular, in some embodiments a hybrid query includes structured subqueries, such as queries written in a domain-specific language (e.g., an SQL). In one or more embodiments, a hybrid query includes unstructured semantic subqueries that request semantic data from unstructured documents (e.g., requesting an answer from a segment of text or a summary of a segment of text).

In some cases, a "semantic filter" refers to an executable function designed to determine relevant data within an unstructured dataset. For example, in one or more embodiments, a semantic filter determines one or more executable semantic operations to perform on the unstructured dataset. In one or more embodiments, a semantic filter matches vectors of the prompt with document-level vectors to identify relevant documents. In some embodiments, a semantic filter performs a binary classification sorting documents as relevant or irrelevant.

In some cases, a "formatting filter" refers to an executable function designed to format a hybrid query according to one or more rules. For example, in one or more embodiments, a formatting filter determines whether or not a prompt is relevant to an associated dataset. In some embodiments, a formatting filter identifies a data schema for data retrieval corresponding to the data requested in a prompt. In one or more embodiments, a formatting filter defines a hybrid query format according to an example hybrid query format.

In addition, the term "machine learning model" refers to a computer algorithm or a collection of computer algorithms that improve for a particular task through iterative outputs or predictions based on use of data. For example, a machine learning model can utilize one or more learning techniques to improve in accuracy and/or effectiveness. Example machine learning models include various types of decision trees, support vector machines, Bayesian networks, random forest models, or neural networks (e.g., deep neural networks, generative adversarial neural networks, convolutional neural networks, recurrent neural networks, or diffusion neural networks). Similarly, the term "machine learning data" refers to information, data, or files generated or utilized by a machine learning model. Machine learning data can include training data, machine learning parameters, or embeddings/predictions generated by a machine learning model.

Relatedly, in some embodiments, a "neural network" includes or refers to a machine learning model that includes interconnected artificial neurons (e.g., organized in layers) that communicate and learn to approximate complex functions and generate outputs (e.g., adjusted digital images) based on a plurality of inputs provided to the neural network. In some cases, a neural network refers to an algorithm (or a set of algorithms) that implements deep learning techniques to model high-level abstractions in data. In one or more embodiments, a neural network includes various layers such as an input layer, one or more hidden layers, and an output layer that each perform tasks for processing data. For example, a neural network includes a deep neural network, a diffusion model, a convolutional neural network, a recurrent neural network (e.g., an LSTM), a graph neural network, or a large language model.

In some cases, a "large language model" ("LLM") refers to a neural network architecture trained to perform computer tasks to generate or identify computing code and/or data in response to prompts (e.g., language or token prompts). A multimodal large language model refers to a large language model that can process and understand multiple types of data (or data modalities), such as text, images, audio, and/or video. In particular, a multimodal large language model includes a neural network (e.g., a deep neural network) with many (e.g., millions or billions of) parameters trained on large quantities of data (e.g., unlabeled text) using a particular learning technique (e.g., self-supervised learning). In one or more embodiments, multimodal LLMs use large datasets to analyze and predict informational patterns to perform tasks like translation, summarization, and conversation. Further, in some embodiments, multimodal LLMs are built in a transformer deep learning framework with many parameters to allow them to infer meaning, enabling sophisticated interactions across various domains. In some cases, a "transformer model" refers to a neural network architecture designed to process sequential data using self-attention and positional encoding. A transformer model processes entire sequences in parallel, capturing long-range dependencies and scale efficiently across large datasets. In particular, a transformer model is composed of layers of self-attention and feed-forward sublayers.

Additional detail regarding the hybrid query filtering system will now be provided with reference to the figures. For example, FIG. 1 illustrates a schematic diagram of an example system environment for implementing a hybrid query filtering system 106 in accordance with one or more embodiments. An overview of the hybrid query filtering system 106 is describe in relation to FIG. 1. Thereafter, a more detailed description of the components and processes of the hybrid query filtering system 106 is provided in relation to the subsequent figures.

As shown, the environment includes a server device(s) 102, a database 114, a network 112, and a client device 116. Each of the components of the environment communicate via the network 112, and the network 112 is any suitable network over which computing devices communicate.

As mentioned, the environment includes a client device 116. The client device 116 is one of a variety of computing devices, including a smartphone, a tablet, a smart television, a desktop computer, a laptop computer, a virtual reality device, an augmented reality device, or another computing device. The client device 116 communicates with the server device(s) 102 via the network 112. For example, the client device 116 provides information to server device(s) 102 indicating client device interactions (e.g., an initial prompt) and receives information from the server device(s) 102 (e.g., a summary of a composite dataset). Thus, in some cases, the hybrid query filtering system 106 on the server device(s) 102 provides and receives information based on client device interactions with the client device 116.

As shown in FIG. 1, the client device 116 includes a client application 118. In particular, the client application 118 is a web application, a native application installed on the client device 116 (e.g., a mobile application, a desktop application, etc.) or a cloud-based application where all or part of the functionality is performed by the server device(s) 102. Based on instructions from the client application 118, the client device 116 presents or displays information to a user via a display device. For example, the client device 116 presents a summary of a data retrieved from a composite database as generated by the hybrid query filtering system 106 in response to a prompt. In some cases, the client device 116 includes a version of the hybrid query filtering system 106.

As illustrated in FIG. 1, the environment includes the server device(s) 102. The server device(s) 102 generates, tracks, stores, processes, receives, and transmits electronic data, such as prompts, structured datasets, unstructured datasets, and summaries of requested data. The server device (s) 102, for example, receives data from the client device 116 in the form of an indication of a client device interaction (e.g., a prompt) to query a composite database. In response, the server device(s) 102 transmits data to the client device 116 to display or present a summary of the requested data based on the client device interaction.

In some embodiments, the server device(s) 102 communicates with the client device 116 to transmit and/or receive data via the network 112 including client device interactions, generated data summaries, and/or other data. In some embodiments, the server device(s) 102 comprises a distributed server where the server device(s) 102 includes a number of server devices distributed across the network 112 and located in different physical locations. The server device(s) 102 comprises a content server, an application server, a communication server, a content editing server, a web-hosting server, a multidimensional server, and/or a machine learning server. The server device(s) 102 further accesses and utilizes the database 114 to store and retrieve information such as structured data, unstructured data, generated summaries of requested data, and all or part of the large language model 108 and the transformer model(s) 110.

As further shown in FIG. 1, the server device(s) 102 also includes the hybrid query filtering system 106 as part of a digital document system 104. For example, in one or more implementations, the digital document system 104 is able to store, generate, modify, edit, provide, distribute, and/or share documents such as structured and/or unstructured documents. In one or more embodiments, the digital document system 104 provides tools for managing digital documents for various downstream computing operations, including utilizing digital documents to modify or create other digital documents. For example, the digital document system 104 provides tools for the client device 116, via the client application 118, to generate summaries of requested data from a composite database by utilizing the large language model 108 and the transformer model(s) 110. Additionally, in some embodiments, the digital document system 104 utilizes the generated summary, or interactions with the generated summary, to perform one or more downstream applications.

In one or more embodiments, the server device(s) 102 includes all, or a portion of, the hybrid query filtering system 106. For example, the hybrid query filtering system 106 operates on the server device(s) 102 to generate summaries of requested information from a composite database. In some cases, the hybrid query filtering system 106 utilizes, locally on the server device(s) 102 or from another network location (e.g., the database 114), the large language model 108 and the transformer model(s) 110 to generate a summary of data requested form a composite database.

In certain cases, the client device 116 includes all or part of the hybrid query filtering system 106. For example, the client device 116 generates, obtains (e.g., downloads), or utilizes one or more aspects of the hybrid query filtering system 106 from the server device(s) 102. Indeed, in some implementations, as illustrated in FIG. 1, the hybrid query filtering system 106 is located in whole or in part on the client device 116. Thus, in some embodiments, the client device 116 utilizes the hybrid query filtering system 106 to generate a summary of requested data from a composite database by utilizing the large language model 108 and the transformer model(s) 110 (hosted on the client device 116 or on another device).

In one or more embodiments, the client device 116 and the server device(s) 102 work together to implement the hybrid query filtering system 106. For example, in some embodiments, the server device(s) 102 provides the large language model 108 and the transformer model(s) 110 to the client device 116 for implementation. In some embodiments, the client device 116 generates a prompt, the server device(s) 102 generates a summary of requested data from a composite database, and the client device 116 presents the summary of requested data for display. To illustrate, the hybrid query filtering system 106 includes a web hosting application that allows the client device 116 to interact with the server device(s) 102. To illustrate, in one or more implementations, the client device 116 accesses a web page supported and/or hosted by the server device(s) 102. Furthermore, in some implementations, the client device 116 assists in generating the summary of the requested data.

Although FIG. 1 illustrates a particular arrangement of the environment, in some embodiments, the environment has a different arrangement of components and/or may have a different number or set of components altogether. For instance, as mentioned, the hybrid query filtering system 106 is implemented by (e.g., located entirely or in part on) the client device 116. In addition, in one or more embodiments, the client device 116 communicates directly with the hybrid query filtering system 106, bypassing the network 112. Further, in some embodiments, the large language model 108 and the transformer model(s) 110 includes one or more components stored in the database 114, maintained by the server device(s) 102, the client device 116, or a third-party device.

Figure 2:
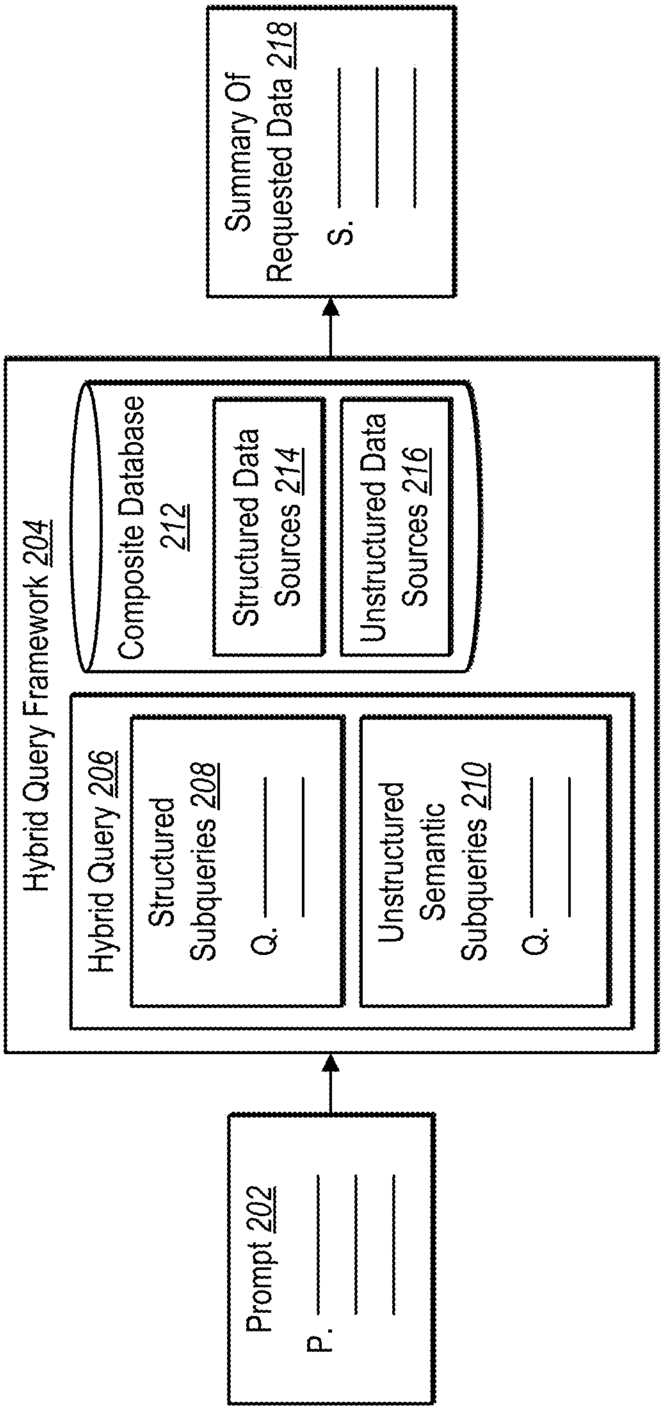
FIG. 2 illustrates a diagram of an overview of the hybrid query filtering system utilizing a hybrid query framework to generate a summary of requested data from a composite database in accordance with one or more embodiments.

As mentioned, in one or more embodiments, the hybrid query filtering system 106 generates a summary of requested data in response to a prompt. FIG. 2 illustrates an overview of the hybrid query filtering system 106 utilizing a hybrid query framework to generate a hybrid query from the prompt to retrieve relevant data from a composite database and provide a summary of the relevant data. Additional detail regarding the various acts and processes mentioned with respect to FIG. 2 is provided thereafter with respect to subsequent figures.

As illustrated in FIG. 2, the hybrid query filtering system 106 receives a prompt 202. In particular, the hybrid query filtering system 106 receives the prompt 202 from a client device requesting information on data included within a database (e.g., requesting a summary of information stored about a past campaign). In one or more embodiments, the hybrid query filtering system 106 receives the prompt 202 via a GUI designed to present information about data stored in a database. More information regarding receiving the prompt via a GUI is provided in relation to FIG. 9.

As further illustrated in FIG. 2, the hybrid query filtering system 106 leverages a hybrid query framework 204 to retrieve and generate a summary of requested data 218 in response to the prompt 202. In one or more embodiments, the hybrid query filtering system 106 utilizes the hybrid query framework 204 by executing a multi-stage query combining structured data retrieval with semantic inference. In some embodiments, the hybrid query filtering system 106 executes the multi-stage query to reduce reliance on large language model inference while preserving the natural language inference capabilities of large language models.

As further illustrated in FIG. 2, the hybrid query filtering system 106 utilizes the hybrid query framework 204 to generate a hybrid query 206 from the prompt 202. In one or more embodiments, the hybrid query filtering system 106 generates the hybrid query 206 by generating one or more structured subqueries 208 and one or more unstructured semantic subqueries 210 corresponding to the prompt 202. In some embodiments, the hybrid query filtering system 106 generates the structured subqueries 208 as one or more queries within a specific database querying language (e.g., SQL). In some embodiments, the hybrid query filtering system 106 generates the unstructured semantic subqueries 210 incorporating one or more semantic primitives (e.g., an "ANSWER" primitive requesting a "yes" or "no" answer from unstructured data and/or a "SUMMARY" primitive requesting a concise answer or insight from unstructured data). In one or more embodiments, the hybrid query filtering system 106 generates the hybrid query 206 by utilizing a hybrid query parser to determine the structured subqueries 208 and the unstructured semantic subqueries 210. More information regarding generating the hybrid query is provided in relation to FIG. 4.

As further illustrated in FIG. 2, the hybrid query filtering system 106 executes the hybrid query 206 on a composite database 212. In one or more embodiments, the hybrid query filtering system 106 determines structured data sources 214 and unstructured data sources 216 within the composite database 212. More information regarding determining the structured data sources 214 and the unstructured data sources 216 is provided in relation to FIG. 3. Further, in one or more embodiments, the hybrid query filtering system 106 executes the hybrid query 206 by executing the structured subqueries 208 for the structured data sources 214 and by executing the unstructured semantic subqueries 210 for the unstructured data sources 216. More information regarding executing the hybrid query 206 is provided in relation to FIGS. 5-6.

As further illustrated in FIG. 2, the hybrid query filtering system 106 generates the summary of requested data 218 by executing the hybrid query 206 on the data included within the composite database 212. In particular, the hybrid query filtering system 106 determines, from the composite database 212, an actionable subset of data that the hybrid query filtering system 106 summarizes to generate the summary of requested data 218. In one or more embodiments, the hybrid query filtering system 106 generates the summary of requested data 218 by prompting a large language model (e.g., the large language model 108 of FIG. 1) with the actionable subset of data. More information regarding generating the summary of requested data is provided in relation to FIGS. 7-8.

Figure 3:
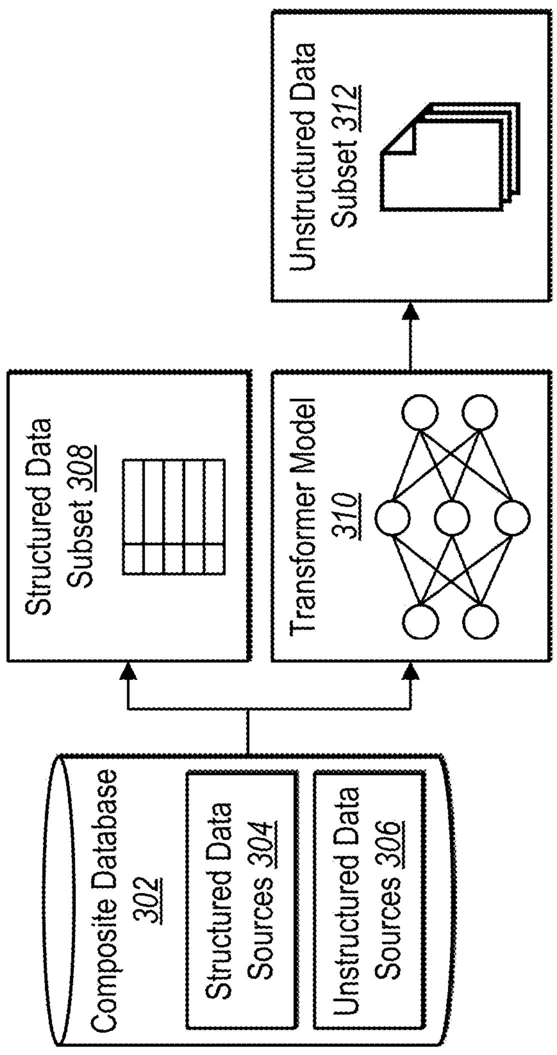
FIG. 3 illustrates a diagram of the hybrid query filtering system generating a structured data subset and an unstructured data subset from a composite database in accordance with one or more embodiments.

As mentioned, in one or more embodiments, the hybrid query filtering system 106 determines, within a composite database, a structured data subset and an unstructured data subset. FIG. 3 illustrates a diagram depicting the hybrid query filtering system 106 generating a structured data subset and utilizing a transformer model to generate an unstructured data subset from a composite database in accordance with one or more embodiments.

As illustrated in FIG. 3, the hybrid query filtering system 106 accesses a composite database 302 including structured data sources 304 and unstructured data sources 306. In one or more embodiments, the composite database 302 includes data that includes a combination of structured data (e.g., the structured data sources 304) and free text (e.g., the unstructured data sources). For example, the composite database 302, in some embodiments, includes information associated with a campaign, with structured data such as campaign IDs, campaign names, and creation timestamps, and with unstructured data such as campaign email content and campaign description. In some embodiments, the composite database 302 includes data such as real-time event streams (e.g., a recorded multimedia presentation) and behavioral logs.

In one or more embodiments, the hybrid query filtering system 106 accesses the composite database 302 in response to a prompt requesting information on a specific dataset stored on the composite database 302 (e.g., in response to a request for information on a past campaign). In one or more embodiments, the composite database 302 includes the structured data sources 304, such as data tables, charts (e.g., graphs), and/or data objects (e.g., JSON objects). In some embodiments, the composite database 302 includes the unstructured data sources 306, such as documents (e.g., text processing documents and/or PDF's), emails, and other natural language documents.

As further illustrated in FIG. 3, the hybrid query filtering system 106 generates a structured data subset 308 from the composite database 302. In particular, the hybrid query filtering system 106 generates the structured data subset 308 by compiling and arranging the structured data sources 304. In one or more embodiments, the hybrid query filtering system 106 generates the structured data subset 308 by generating a structured representation of the structured data sources 304 (e.g., by generating a structured data table of campaign records).

As further illustrated in FIG. 3, the hybrid query filtering system 106 utilizes a transformer model 310 to generate an unstructured data subset 312. In particular, the hybrid query filtering system 106 utilizes the transformer model 310 to extract, filter, and edit text included within the unstructured data sources 306. In one or more embodiments, the hybrid query filtering system 106 generates the unstructured data subset 312 as an index of the data included within the unstructured data sources 306 (e.g., by generating an index of documents within a campaign). In some embodiments, the hybrid query filtering system 106 generates the unstructured data subset 312 as an index organized according to an embedding distance (e.g., generating the unstructured data subset 312 as an approximate nearest neighbor index). In one or more embodiments, the hybrid query filtering system 106 generates the unstructured data subset 312 by utilizing an ingestion service to update the unstructured data subset 312.

In one or more embodiments, the hybrid query filtering system 106 generates the structured data subset 308 and the unstructured data subset 312 so that the structured data subset 308 and the unstructured data subset 312 include one or more shared documents. For example, if a specific document within the composite database 302 includes both structured data (e.g., a data table) and unstructured data (natural language describing the data table), the hybrid query filtering system 106 generates the structured data subset 308 and the unstructured data subset 312 so that the specific document is included in both the structured data subset 308 and the unstructured data subset 312.

Figure 4:
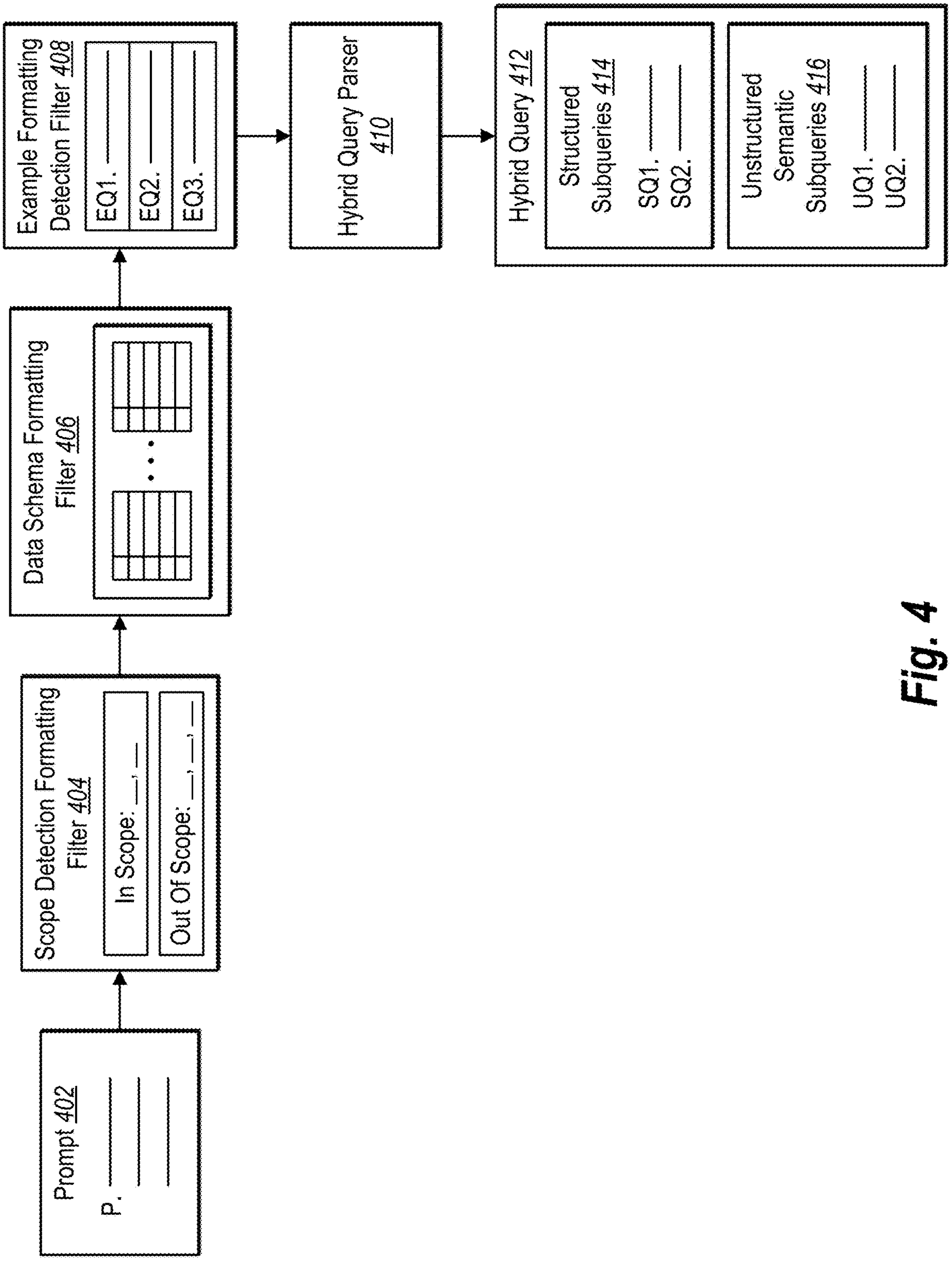
FIG. 4 illustrates a diagram of the hybrid query filtering system generating a hybrid query from a prompt in accordance with one or more embodiments.

As mentioned, in one or more embodiments, the hybrid query filtering system 106 utilizes a hybrid query parser to generate a hybrid query from a prompt. FIG. 4 illustrates a diagram depicting the hybrid query filtering system 106 utilizing one or more formatting filters and a hybrid query parser to generate a hybrid query with structured subqueries and unstructured semantic subqueries in accordance with one or more embodiments.

As illustrated in FIG. 4, the hybrid query filtering system 106 receives a prompt 402. In one or more embodiments, the hybrid query filtering system 106 receives the prompt 402 as a request, from a client device (e.g., the client device 116 of FIG. 1), for data about a specific data collection (e.g., requesting data associated with conversion rates of a marketing campaign). In some embodiments, the hybrid query filtering system 106 determines that the prompt 402 requests information from both structured data and unstructured data within a composite database (e.g., the composite database 302 of FIG. 3). For example, the hybrid query filtering system 106 determines that a prompt requesting "list my campaigns that are about discounts and created in the last 3 months" requests both structured data (e.g., creation date within the past 3 months) and unstructured data (e.g., content indicating discounts). In one or more embodiments, the hybrid query filtering system 106 includes support for prompts generated in a plurality of languages (e.g., Spanish, Russian, Sanskrit, and Mandarin).

As further illustrated in FIG. 4, the hybrid query filtering system 106 utilizes a scope detection formatting filter 404 to determine whether the prompt 402 falls within the scope of the data included within a composite database (e.g., the composite database 302 of FIG. 3). In one or more embodiments, the hybrid query filtering system 106 utilizes the scope detection formatting filter 404 by utilizing one or more example prompts to determine the relevance of the prompt 402, identifying the prompt as in scope or out of scope by comparing the prompt to the example prompts. For example, if the prompt 402 is requesting data relating to the duration of a campaign, the hybrid query filtering system 106 leverages the scope detection formatting filter 404 to determine, based on sourcing an example prompt associated with duration, that the prompt 402 is within scope.

As further illustrated in FIG. 4, the hybrid query filtering system 106 leverages a data schema formatting filter 406. In particular, the hybrid query filtering system 106 utilizes the data schema formatting filter 406 to identify a relevant data schema to utilize as context for generating a hybrid query. In one or more embodiments, the hybrid query filtering system 106 utilizes the data schema formatting filter 406 to determine, from a set of example data schemas, a data schema suitable for the data requested by the prompt 402. In one or more embodiments, the hybrid query filtering system 106 further utilizes the data schema formatting filter 406 to determine an executable computer language (e.g., a data definition language or "DDL") to utilize when generating one or more structured subqueries (e.g., the structured subqueries 414) within a hybrid query.

As further illustrated in FIG. 4, the hybrid query filtering system 106 employs an example formatting detection filter 408. In particular, the hybrid query filtering system 106 utilizes the example formatting detection filter 408 to determine a sample hybrid query format in which to format a hybrid query. In one or more embodiments, the hybrid query filtering system 106 utilizes the example formatting detection filter 408 to decompose and analyze the prompt 402 and, by retrieving a sample hybrid query format, determine a format for a hybrid query. For example, the hybrid query filtering system 106 includes a table such as the following:

| Hybrid Query Type | Example Prompt | Example Hybrid Query |
|---|---|---|
| Structured Query Only | Which campaigns had more than 1 million impressions? | SELECT campaignName, campaignID, FROM hdk_dim_campaign WHERE impressions > 1000000; |
| Free-Text Summary | What is the main message of each campaign? | SELECT campaignName, campaignID, SUMMARY(campaignContent) AS mainMessage FROM hkg_dim_campaign; |
| QA-Based Filtering | Which campaigns promote a discount? | SELECT campaignName, campaignID FROM hkg_dim_campaign WHERE ANSWER(campaignContent, 'is this campaign about a discount?') = 'Yes'; |
| Combined Structured + Free-Text Filter | Which email campaigns from 2024 are promoting loyalty rewards? | SELECT campaignName, campaign ID FROM hkg_dim_campaign WHERE channel = 'email' AND year = 2024 AND ANSWER(campaignContent, 'is this campaign about loyalty rewards?') = 'Yes'; |
| Ranking Based on Free-Text Feedback | List the campaigns that offered a discount of more than 5%. | SELECT campaignName, campaignID FROM hkg_dim_campaign WHERE CAST(ANSWER(campaignContent, 'what is the discount offered in this email?') AS FLOAT) > 5; |

As further illustrated in FIG. 4, the hybrid query filtering system 106 utilizes a hybrid query parser 410 to generate a hybrid query 412. In one or more embodiments, the hybrid query filtering system 106 utilizes the hybrid query parser 410 to analyze the schema identified by the data schema formatting filter 406 and the sample hybrid query format from the example formatting detection filter 408 to generate the hybrid query 412 from the prompt 402. In one or more embodiments, the hybrid query filtering system 106 utilizes the hybrid query parser 410 to generate the hybrid query 412 by identifying one or more subprompts within the prompt 402 and, by utilizing the schema and the sample hybrid query format as rules to guide the hybrid query parser 410, generating the hybrid query 412. In one or more embodiments, the hybrid query filtering system 106 generates the hybrid query 412 with both structured predicates (e.g., the structured subqueries 414) and unstructured constraints (e.g., the unstructured semantic subqueries 416).

As further illustrated in FIG. 4, the hybrid query filtering system 106 generates the hybrid query 412 with one or more structured subqueries 414. In particular, the hybrid query filtering system 106 generates the one or more structured subqueries 414 by identifying one or more subprompts identified by the hybrid query parser 410 as corresponding to structured data and, by utilizing the hybrid query parser 410, generating the structured subqueries 414. In one or more embodiments, the hybrid query filtering system 106 generates the structured subqueries 414 within a domain-specific language (e.g., SQL) for extracting structured data.

As further illustrated in FIG. 4, the hybrid query filtering system 106 generates the hybrid query 412 with one or more unstructured semantic subqueries 416. In particular, the hybrid query filtering system 106 generates the unstructured semantic subqueries 416 by identifying that one or more of the subprompts identified by the hybrid query parser 410 correspond to a semantic operation corresponding to unstructured data. For example, the hybrid query filtering system 106, in response to a prompt requesting data about urgent ad campaigns, generates the unstructured semantic subqueries 416 to identify unstructured language indicating urgency (e.g., "Limited Time Offer" or "Act Now").

In one or more embodiments, the hybrid query filtering system 106 generates the unstructured semantic subqueries 416 by determining one or more semantic operations corresponding to the subprompts identified by the hybrid query parser 410. For example, the hybrid query filtering system 106, in response to a request to determine whether a text field satisfies an intent, generates an unstructured subquery of the unstructured semantic subqueries 416 as an "ANSWER" semantic operation (e.g., ANSWER (campaignContent, "is this campaign about discounts?")). In another example, the hybrid query filtering system 106 generates an unstructured subquery of the unstructured semantic subqueries 416 as a "SUMMARY" semantic operation to summarize unstructured data (e.g., summarizing the content of documents associated with a campaign). In one or more embodiments, the hybrid query filtering system 106 generates the semantic operations composing the one or more unstructured semantic subqueries 416 as callable functions within a larger hybrid query framework that supports nested and composable use (e.g., the hybrid query framework 204 of FIG. 2). In some embodiments, the hybrid query filtering system 106 generates the unstructured semantic subqueries 416 as the semantic operations to allow nesting within a larger structured query (e.g., an SQL query) due to relational compatibility.

As an example, the hybrid query filtering system 106, in response to a prompt 402 requesting data about campaigns about discounts, generates a hybrid query 412 as follows:

"SELECT id, campaignname, createdtime FROM hkg_dim_campaign WHERE answer (campaigncontent, 'Is this email about discounts or special offers?')='yes' ORDER by createdtime DESC LIMIT 10;" where "SELECT id, campaignname, createdtime" represents structured subqueries requesting structured data (i.e., campaign name and campaign created time) and "answer (campaigncontent, 'Is this email about discounts or special offers?')" represents an unstructured semantic subquery requesting unstructured data (i.e., a determination whether a campaign is about discounts or special offers).

Figure 5:
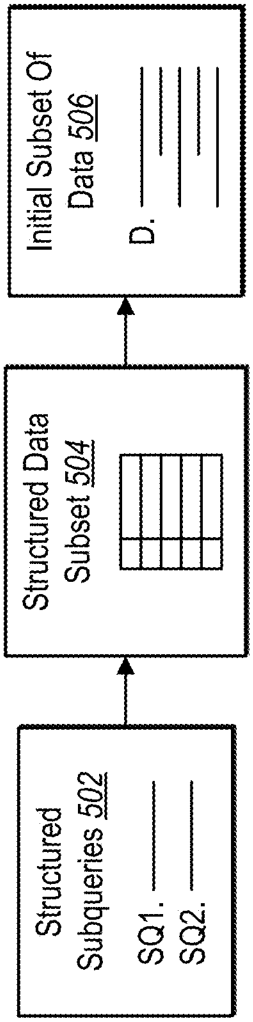
FIG. 5 illustrates a diagram of the hybrid query filtering system executing structured subqueries to generate an initial subset of data in accordance with one or more embodiments.

As mentioned, in one or more embodiments, the hybrid query filtering system 106 executes structured subqueries on a structured data subset. FIG. 5 illustrates a diagram depicting the hybrid query filtering system 106 executing structured subqueries on a structured data subset to generate an initial subset of data in accordance with one or more embodiments.

As illustrated in FIG. 5, the hybrid query filtering system 106 executes one or more structured subqueries 502 on a structured data subset 504 to generate an initial subset of data 506. In particular, the hybrid query filtering system 106 accesses the structured data subset 504 from the composite database (e.g., by accessing the structured data subset 308 of FIG. 3). In some embodiments, the hybrid query filtering system 106 accesses the structured subqueries 502 from a hybrid query (e.g., by accessing the structured subqueries 414 from the hybrid query 412 of FIG. 4). In one or more embodiments, the hybrid query filtering system 106 accesses the structured subqueries 502 by reordering operations within the hybrid query to execute the structured subqueries 502 before any unstructured semantic subqueries (e.g., the unstructured semantic subqueries 416 of FIG. 4). In one or more embodiments, the hybrid query filtering system 106 executes the structured subqueries 502 by executing one or more structured predicates (e.g., searching date ranges, campaign types) from the structured data subset 504 by iterating over a structured format (e.g., a data table).

As further illustrated in FIG. 5, the hybrid query filtering system 106 generates the initial subset of data 506 by executing the one or more structured subqueries 502 on the structured data subset 504. In particular, the hybrid query filtering system 106 generates the initial subset of data 506 by determining, from the structured data subset 504, data sources within the composite database that match the structured data sought by the hybrid query (e.g., the hybrid query 412). In some embodiments, the hybrid query filtering system 106 determines the initial subset of data 506 by determining, within documents that both include structured and unstructured data, documents that align with the hybrid query. In one or more embodiments, the hybrid query filtering system 106 stores the initial subset of data 506 for potential reuse by subsequent hybrid queries requesting data associated with similar structured data (e.g., a query requesting data about the same timeframe as the timeframe requested in the prompt 402 of FIG. 4).

Figure 6:
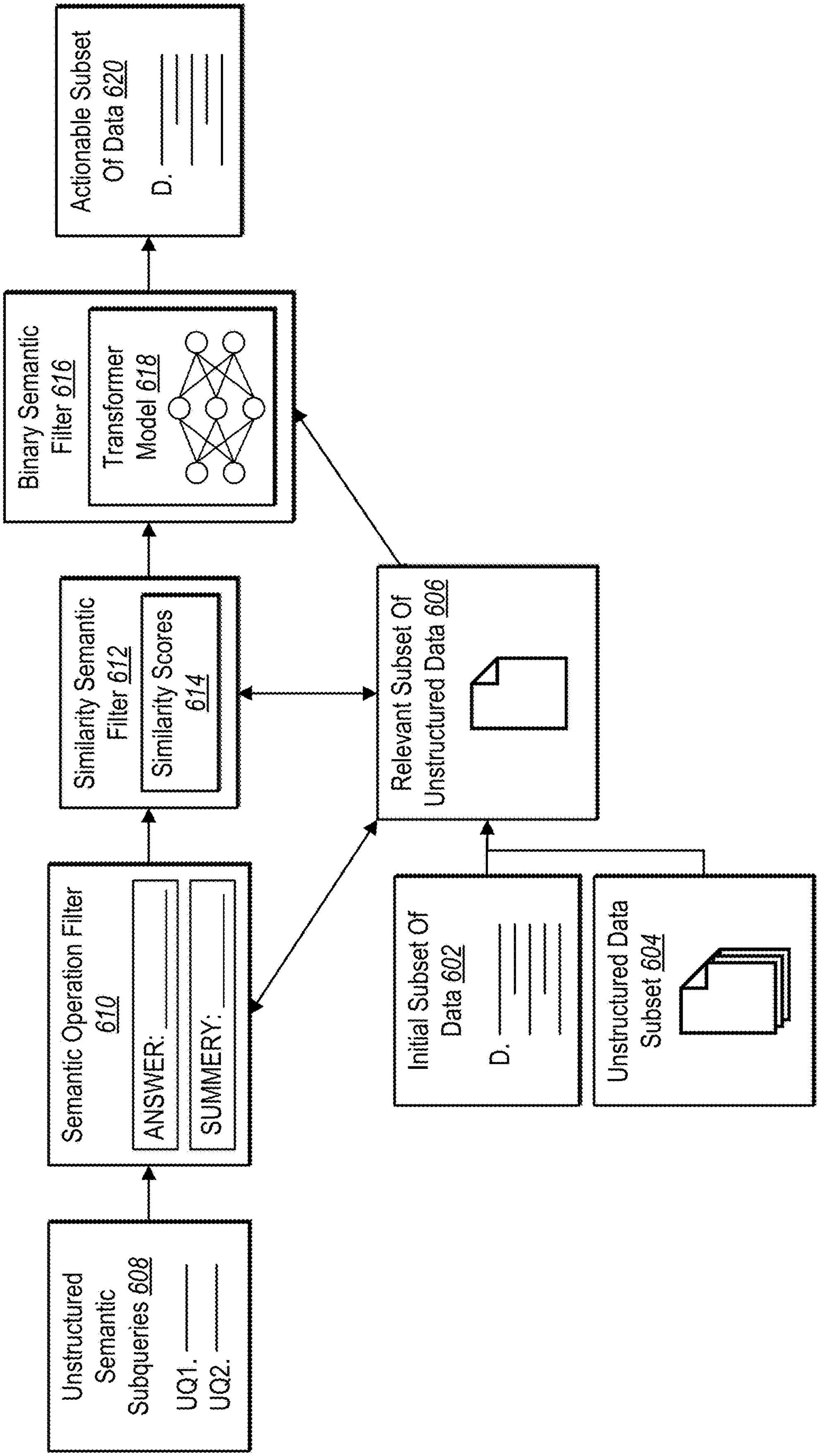
FIG. 6 illustrates a diagram of the hybrid query filtering system generating an actionable subset of data by utilizing semantic filters in accordance with one or more embodiments.

As mentioned, in one or more embodiments, the hybrid query filtering system 106 executes unstructured semantic subqueries over unstructured data subsets to generate an actionable subset of data. FIG. 6 illustrates a diagram depicting the hybrid query filtering system 106 utilizing a series of semantic filters to execute the unstructured semantic subqueries over an unstructured data subset to generate an actionable subset of data.

As illustrated in FIG. 6, the hybrid query filtering system 106 determines, from the initial subset of data 602 and the unstructured data subset 604, a relevant subset of unstructured data 606. In particular, the hybrid query filtering system 106 determines, by comparing data of the initial subset of data 602 with the unstructured data subset 604, the relevant subset of unstructured data 606. For example, if the hybrid query filtering system 106 determines that the initial subset of data 602 (as determined by the process depicted in FIG. 5) corresponds to a set of past campaigns, the hybrid query filtering system 106 determines the relevant subset of unstructured data 606 from the unstructured data subset 604 as unstructured data corresponding to the same set of past campaigns.

As further illustrated in FIG. 6, the hybrid query filtering system 106 utilizes a semantic operation filter 610 to execute one or more unstructured semantic subqueries 608 within the relevant subset of unstructured data 606. In particular, the hybrid query filtering system 106 utilizes the semantic operation filter 610 to determine one or more semantic operations to perform corresponding to the unstructured semantic subqueries 608. For example, the hybrid query filtering system 106, if the unstructured semantic subqueries 608 request an ANSWER and a SUMMARY subquery, utilizes the semantic operation filter 610 to identify that an ANSWER and SUMMARY operation are needed.

As further illustrated in FIG. 6, the hybrid query filtering system 106 utilizes a similarity semantic filter 612 to generate similarity scores 614 from the relevant subset of unstructured data 606 and the unstructured semantic subqueries 608. In one or more embodiments, the hybrid query filtering system 106 generates, from the relevant subset of unstructured data 606, an index of sentence-level vectors corresponding to the relevant subset of unstructured data 606. Further, in one or more embodiments, the hybrid query filtering system 106 utilizes the similarity semantic filter 612 to generate vectors corresponding to the unstructured semantic subqueries 608. In some embodiments, the hybrid query filtering system 106 compares the index of vectors corresponding to the relevant subset of unstructured data 606 with the vectors corresponding to the unstructured semantic subqueries 608 to determine the similarity scores 614. In one or more embodiments, the hybrid query filtering system 106 determines the similarity scores 614 to determine a set of relevant documents within the relevant subset of unstructured data 606 (e.g., by determining the top-K most semantically relevant candidates from the relevant subset of unstructured data 606).

As further illustrated in FIG. 6, the hybrid query filtering system 106 utilizes a binary semantic filter 616 and a transformer model 618 to generate the actionable subset of data 620 based on the set of relevant documents determined by the similarity scores 614. In particular, the hybrid query filtering system 106 utilizes the transformer model 618 within the binary semantic filter 616 to determine whether the set of relevant documents determined by the similarity scores 614 satisfy an input natural language condition (e.g., whether the campaign is about a discount) by determining a binary classification (e.g., yes or no) according to the relevant subset of unstructured data 606. In one or more embodiments, the hybrid query filtering system 106 utilizes the transformer model 618 to determine, from the documents determined by the similarity scores 614, the actionable subset of data 620 that satisfies the input natural language condition. In some embodiments, the hybrid query filtering system 106 removes data from the relevant subset of unstructured data 606 in response to the binary semantic filter 616 generating a binary classification (e.g., no) indicating that the data is not relevant to responding to a prompt (e.g., the prompt 402 of FIG. 4).

In some embodiments, the hybrid query filtering system 106 determines, in response to a client device interaction, a transformer model type to utilize for the transformer model 618. For example, in response to a client device interaction requesting lower latency responses, the hybrid query filtering system 106 utilizes a base transformer model for the transformer model 618. In contrast, in some embodiments, in response to a client device interaction requesting higher accuracy responses, the hybrid query filtering system 106 utilizes a more complex transformer model as the transformer model 618. In one or more embodiments, the hybrid query filtering system 106 dynamically selects a transformer model in response to one or more semantic cues within an initial prompt (e.g., selecting a more complex transformer model in response to a client device prompt requesting further information about data already summarized).

In some embodiments, the hybrid query filtering system 106 trains the transformer model 618 to generate binary classifications (e.g., yes or no). In one or more embodiments, the hybrid query filtering system 106 trains the transformer model 618 on a document set of question/passage pairs annotated with binary (yes/no) labels. In some embodiments, the hybrid query filtering system 106 trains the transformer model 618 to predict the binary label corresponding to the question/passage pair. In particular, the hybrid query filtering system 106 tokenizes the question/passage pair and utilizes the transformer model 618 to predict the binary label corresponding to the question/passage pair. Further, in one or more embodiments, the hybrid query filtering system 106 utilizes a loss function (e.g., cross-entropy loss) to reduce difference between the predictions generated by the transformer model 618 and the binary label. In some embodiments, the hybrid query filtering system 106 defines the function of the transformer model 618 according to the following equation:

$M(t, q) \rightarrow \{yes, no\}$ where t is a text field (e.g., sourced from the relevant subset of unstructured data 606) and q is a query (e.g., from the unstructured semantic subqueries 608).

As further illustrated in FIG. 6, the hybrid query filtering system 106 generates the actionable subset of data 620. In some embodiments, the hybrid query filtering system 106 generates the actionable subset of data 620 as those documents that satisfy both structured subqueries (e.g., the structured subqueries 502 of FIG. 5) and the unstructured semantic subqueries 608. In one or more embodiments, the hybrid query filtering system 106 generates the actionable subset of data by filtering the relevant subset of unstructured data 606 according to the semantic filters (e.g., the semantic operation filter 610, the similarity semantic filter 612, and/or the binary semantic filter 616).

Figure 7:
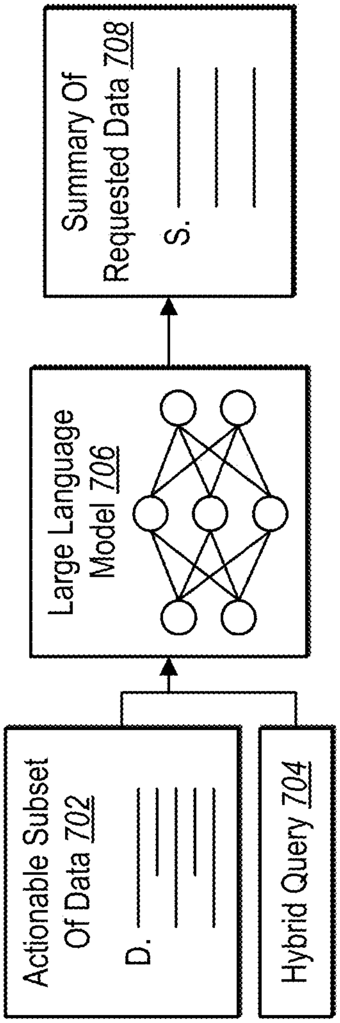
FIG. 7 illustrates a diagram of the hybrid query filtering system utilizing a large language model to generate a summary of requested data from the actionable subset of data in accordance with one or more embodiments.

As mentioned, in one or more embodiments, the hybrid query filtering system 106 utilizes a large language model to generate a summary of requested data. FIG. 7 illustrates a diagram depicting the hybrid query filtering system 106 utilizing a large language model to generate a summary of requested data from an actionable subset of data in accordance with one or more embodiments.

As illustrated in FIG. 7, the hybrid query filtering system 106 utilizes a large language model 706 to generate a summary of requested data 708 from an actionable subset of data 702 in response to a hybrid query 704. In particular, the hybrid query filtering system 106 utilizes the large language model 706 to determine, from the hybrid query 704 and the actionable subset of data 702, that the actionable subset of data 702 includes data sufficient to respond to the hybrid query 704. In one or more embodiments, the hybrid query filtering system 106 determines that the actionable subset of data 702 includes data sufficient to respond to the hybrid query 704 by leveraging the large language model 706 to execute a natural language prompt to determine whether one or more relevance constraints apply to the actionable subset of data 702. In one or more embodiments, the hybrid query filtering system 106 utilizes the large language model 706 to generate the summary of requested data 708 by summarizing the actionable subset of data 702 according to the requests within the hybrid query 704.

Figure 8:
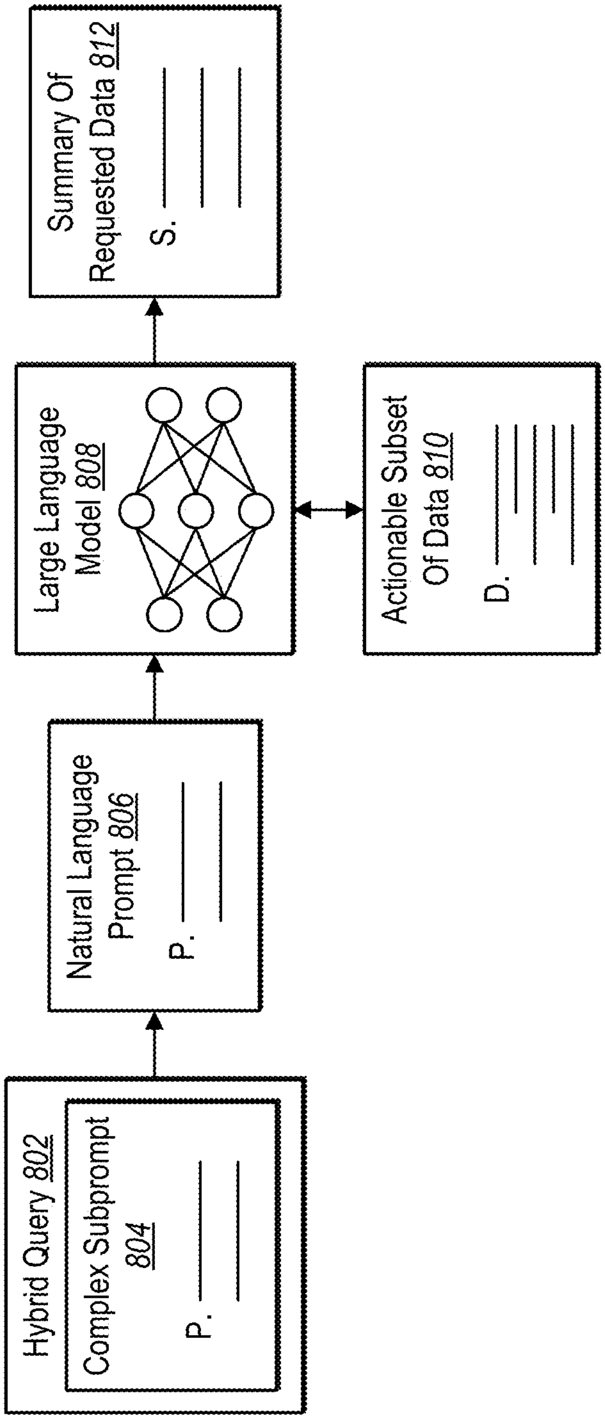
FIG. 8 illustrates a diagram of the hybrid query filtering system utilizing a large language model to generate a summary of requested data from a complex subprompt in accordance with one or more embodiments.

As mentioned, in one or more embodiments, the hybrid query filtering system 106 utilizes a large language model to generate a response to a complex subprompt. FIG. 8 illustrates the hybrid query filtering system 106 utilizing a large language model to identify a complex subprompt within a hybrid query and generate a summary of requested data from an actionable subset of data in response to the hybrid query in accordance with one or more embodiments.

As illustrated in FIG. 8, the hybrid query filtering system 106 identifies a complex subprompt 804 within a hybrid query 802. In one or more embodiments, the hybrid query filtering system 106 determines the complex subprompt 804 in response to determining that the hybrid query 802 includes subprompts that pass one or more semantic filters (e.g., the semantic operation filter 610, the similarity semantic filter 612, and/or the binary semantic filter 616 of FIG. 6) but include one or more subprompts not answered by the one or more semantic filters or a structured data subset (e.g., the structured data subset 504 of FIG. 5). In some embodiments, the hybrid query filtering system 106 identifies the complex subprompt 804 by identifying one or more subprompts within the hybrid query 802 that require more nuanced evaluation.

As further illustrated in FIG. 8, the hybrid query filtering system 106 generates a natural language prompt 806 corresponding to the complex subprompt 804. In one or more embodiments, the hybrid query filtering system 106 generates the natural language prompt 806 as an executable prompt configured for execution by a large language model (e.g., the large language model 808). Further, in some embodiments, the hybrid query filtering system 106 utilizes the large language model 808 to generate, from the natural language prompt 806 and an actionable subset of data 810, a summary of requested data 812. In one or more embodiments, the hybrid query filtering system 106 utilizes the large language model 808 to identify data within the actionable subset of data 810 that responds to the hybrid query 802 and the natural language prompt 806 for generating the summary of requested data 812.

In some embodiments, the hybrid query filtering system 106 presents one or more improvements to conventional systems for generating summaries of data in response to a prompt. For example, the hybrid query filtering system 106, by utilizing a set of semantic filters (e.g., the semantic operation filter 610, the similarity semantic filter 612, and/or the binary semantic filter 616 of FIG. 6) and a large language model (e.g., the large language model 706 of FIG. 7) avoids false positive matches within a dataset. For example, in response to a query that requests "list campaigns that offer a discount," a conventional model would include data including the sentence "this campaign does not offer a discount at this time" as it includes the term "discount." In contrast, the hybrid query filtering system 106 determines, by utilizing the set of semantic filters and the large language model, that the data including the sentence "this campaign does not offer a discount at this time" as out of scope to the question requesting campaigns offering a discount.

Further, in one or more embodiments, the hybrid query filtering system 106, by utilizing the set of semantic filters and the large language model, identifies semantics within a dataset. For example, in response to a query that requests "which campaigns create urgency," a conventional model would miss indirect phrases such as "hurry before it's gone," "limited slots left," or "final call," as they do not utilize phrases directly indicating urgency. In contrast, the hybrid query filtering system 106, by utilizing the large language model, identifies semantic nuance to identify indirect phrases corresponding to a query.

Indeed, in some embodiments, the hybrid query filtering system 106 improves retrieval of data from a composite database. In one or more embodiments, the hybrid query filtering system 106 demonstrates improved retrieval and matching of an initial query. In some embodiments, the hybrid query filtering system 106 demonstrated improved performance within both an internally sourced composite database of prior marketing analytics data (the "Internal Corpus" in the table below) and a public composite database (the "HybridQA" in the table below). As demonstrated in the table below, the hybrid query filtering system 106 improves exact match (EM) accuracy, wherein the answer of the hybrid query filtering system 106 matches a ground-truth answer (e.g., by retrieving all required data and not retrieving any extra data), as well as improving an F1 score that denotes the harmonic mean of precision (i.e., how many of the retrieved records were relevant) and recall (i.e., how many of the relevant records were successfully retrieved):

| | | Trained | HybridQA | | | | Internal Corpus | | | |
|---|---|---|---|---|---|---|---|---|---|---|
| | | on | Dev | | Test | | Dev | | Test | |
| Method | Model | (Size) | EM | F1 | EM | F1 | EM | F1 | EM | F1 |
| LLaMA2 (7B) | LLaMA2 (7B) | Zero-shot | 20.7 | — | — | — | 15.2 | — | — | — |
| TableLlama | TableInstruct | Few-shot | 27.6 | — | — | — | 18.1 | — | — | — |
| End-to-End QA w/Retriever | GPT-4 | Zero-shot | 24.5 | 30.0 | — | — | 19.8 | 28.2 | — | — |
| HPROPRO | GPT-4 | Few-shot | 48.0 | 54.6 | 48.7 | 57.7 | 47.6 | 53.0 | 49.1 | 56.4 |
| Hybrid query filtering system 106 | Transformer + Large Language Model | Few-shot | 62.3 | 72.3 | 59.0 | 64.4 | 87.9 | 94.3 | 91.2 | 94.4 |

Indeed, as illustrated in the table above, the hybrid query filtering system 106 demonstrates improvements in both the EM and F1 scores as compared to four conventional systems for generating summaries of requested data from composite databases. In particular, the hybrid query filtering system 106 outperforms few-shot approaches such as HPROPRO and significantly outperforms zero-shot approaches such as TableLLAMA and LLAMA2, demonstrating the advantage of hybrid query formulation and execution over models that utilize purely tables or unverified retrievals. Further, the hybrid query filtering system 106 demonstrates increased performance within the internally sourced composite database, demonstrating specific effectiveness in enterprise analytics (e.g., processing ad campaign data).

Figure 9:
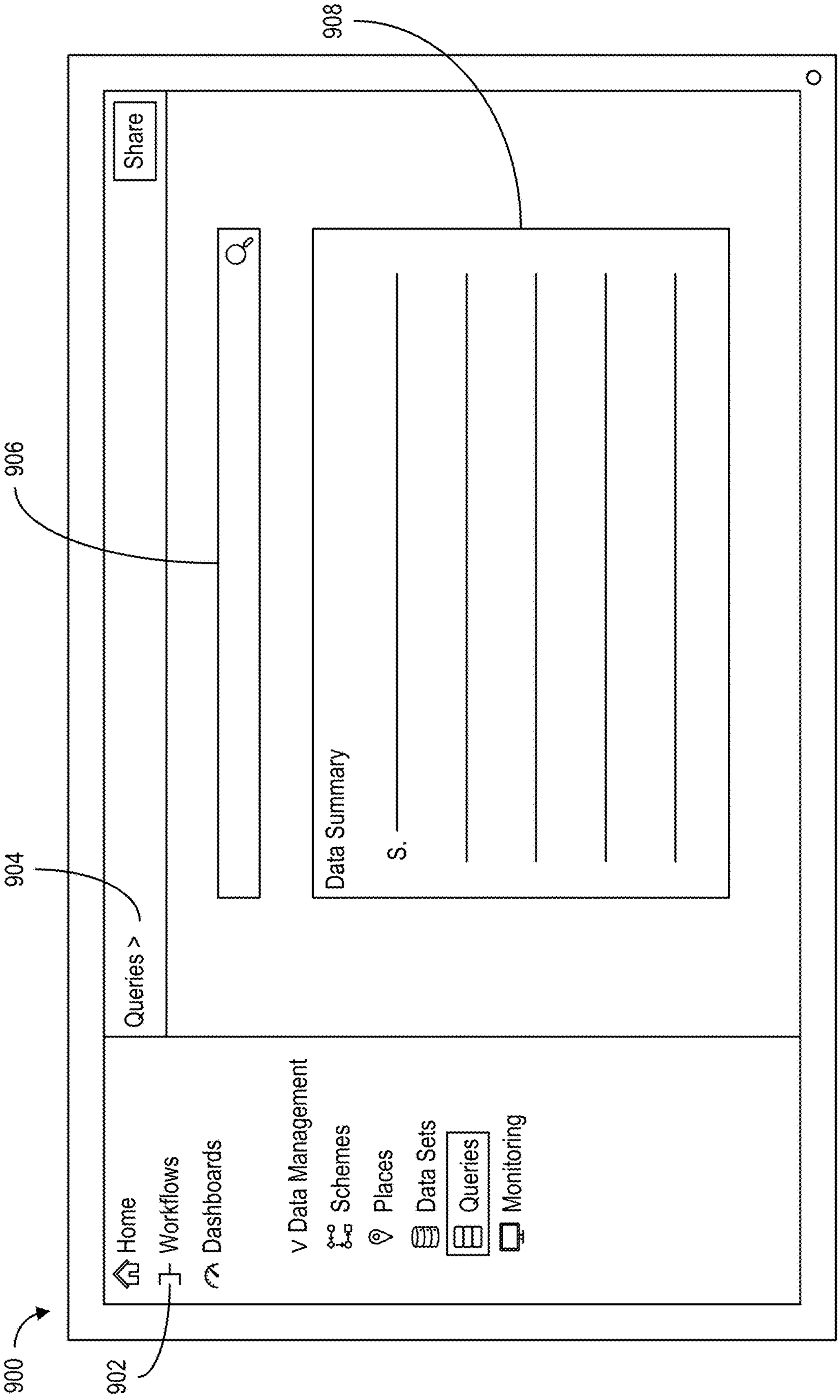
FIG. 9 illustrates an example graphical user interface within which a hybrid query filtering system presents a summary of requested data in accordance with one or more embodiments.

As mentioned, in one or more embodiments, the hybrid query filtering system 106 generates and presents a GUI through which a client device enters prompts and views a generated summary of requested data. FIG. 9 illustrates a sample GUI through which a client device enters a prompt and views a generated summary of requested data in accordance with one or more embodiments.

As illustrated in FIG. 9, the hybrid query filtering system 106 presents a workflow tab 902 within a data summary GUI 900. In particular, the hybrid query filtering system 106, in response to a client device interaction with the workflow tab 902, presents a tool for requesting data from a composite database. In one or more embodiments, the hybrid query filtering system 106, in response to the client device interaction with the workflow tab 902, accesses a queries tab 904.

As further illustrated in FIG. 9, the hybrid query filtering system 106 presents a search tool 906 within the data summary GUI 900. In one or more embodiments, the hybrid query filtering system 106 presents the search tool 906 as a natural language interface tool through which the client device enters a prompt requesting data (e.g., the prompt 402 of FIG. 4). In some embodiments, the hybrid query filtering system 106 generates, in response to a single client device interaction with the search tool 906 (e.g., entering a natural language prompt), a hybrid query including both structured subqueries and unstructured semantic subqueries (e.g., the hybrid query 412 of FIG. 4).

As further illustrated in FIG. 9, the hybrid query filtering system 106, in response to a client device interaction with the search tool 906, generates a summary of the requested data presented via a summarization tool 908. In one or more embodiments, the hybrid query filtering system 106 utilizes the summarization tool 908 to present the summary of the requested data as a plain text summary of data associated with a query. In some embodiments, the hybrid query filtering system 106 utilizes the summarization tool 908 to generate a graphical representation (e.g., a chart, table, and/or pictorial representation) of the requested data.

Figure 10:
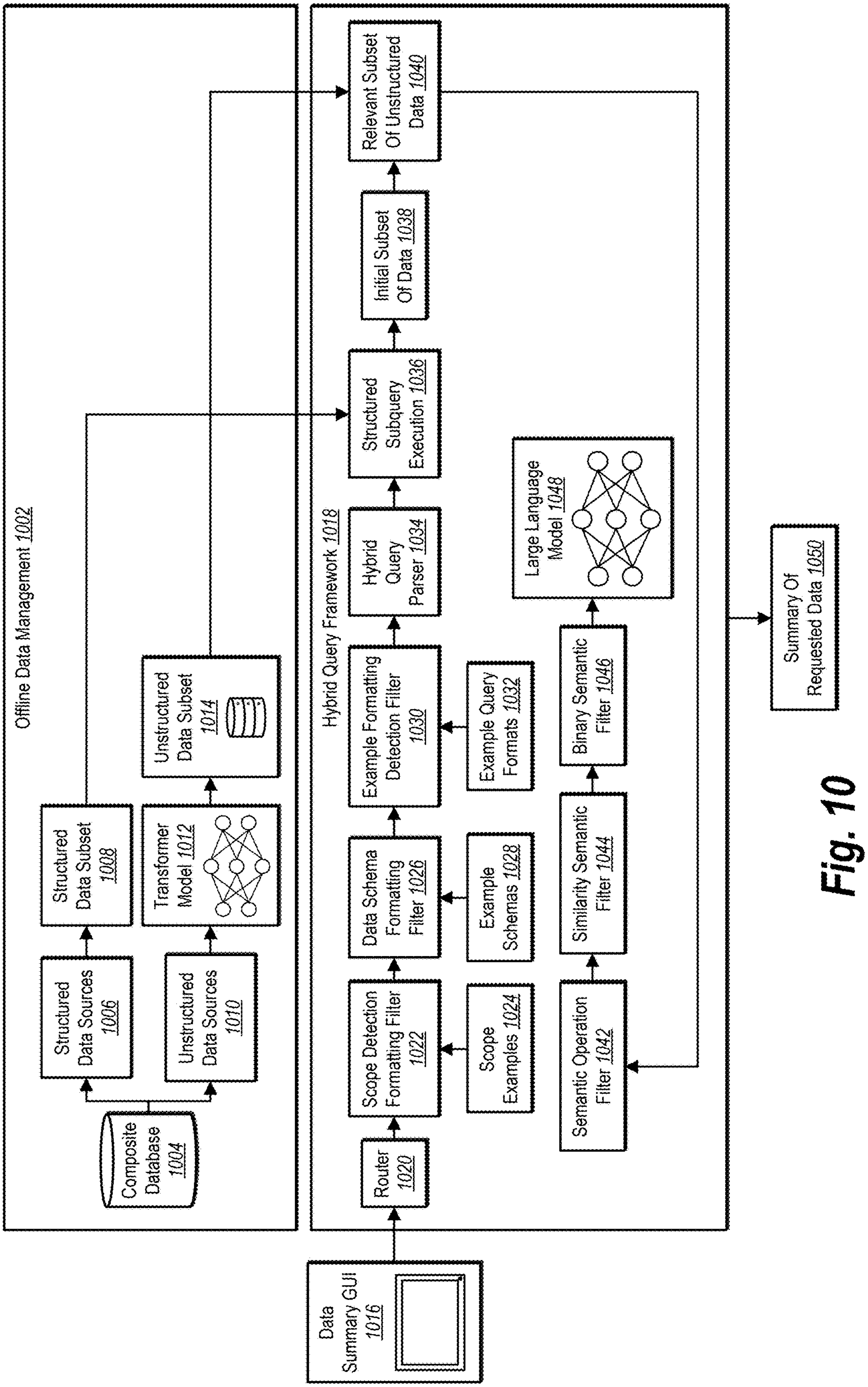
FIG. 10 illustrates a diagram of the hybrid query filtering system utilizing an offline data management coupled with a hybrid query framework to generate a summary of requested data in accordance with one or more embodiments.

As mentioned, in one or more embodiments, the hybrid query filtering system 106 utilizes an offline data management pipeline in concert with a hybrid query framework. FIG. 10 illustrates the hybrid query filtering system 106 utilizing an offline data management pipeline to generate a structured data subset and unstructured data subset for utilization within a hybrid query framework in accordance with one or more embodiments.

As illustrated in FIG. 10, the hybrid query filtering system 106 performs offline data management 1002. In particular, the hybrid query filtering system 106 performs offline data management 1002 by generating, from a composite database 1004, a structured data subset 1008 and an unstructured data subset 1014. In one or more embodiments, the hybrid query filtering system 106 maintains the composite database 1004 as filtered and deduplicated text content and as a dataset table. In one or more embodiments, the hybrid query filtering system 106 generates the structured data subset 1008 by utilizing a structured data table (e.g., a campaign records table) to store structured data sources 1006. In some embodiments, the hybrid query filtering system 106 generates the unstructured data subset 1014 by utilizing a document index generated by an ingestion service (e.g., the transformer model 1012) from unstructured data sources 1010. More information regarding generating the structured data subset 1008 and the unstructured data subset 1014 within the offline data management 1002 is described in relation to FIG. 3.

As further illustrated in FIG. 10, the hybrid query filtering system 106, in response to an interaction with a data summary GUI 1016 (e.g., a prompt), generates a summary of requested data 1050 by executing a hybrid query framework 1018. In particular, the hybrid query filtering system 106 utilizes the hybrid query framework 1018 to perform a multi-stage execution flow to respond to the interaction with the data summary GUI 1016. In one or more embodiments, the hybrid query filtering system 106 utilizes a router 1020 to generate a hybrid query within the hybrid query framework 1018 by executing one or more parsing filters (e.g., a scope detection formatting filter 1022, a data schema formatting filter 1026, and/or an example formatting detection filter 1030) and a hybrid query parser 1034. In one or more embodiments, the hybrid query filtering system 106 executes the one or more parsing filters in concert with example data (e.g., scope examples 1024, example schemas 1028, and/or example query formats 1032). More information regarding generating the hybrid query within the hybrid query framework 1018 is described in relation to FIG. 4.

As further illustrated in FIG. 10, the hybrid query filtering system 106 performs a structured subquery execution 1036 within the hybrid query framework 1018. In particular, the hybrid query filtering system 106 accesses, from the structured data subset 1008 within the offline data management 1002, structured data upon which the hybrid query filtering system 106 performs the structured subquery execution 1036 to generate an initial subset of data 1038. More information regarding performing the structured subquery execution 1036 to generate the initial subset of data 1038 is described in relation to FIG. 5.

As further illustrated in FIG. 10, the hybrid query filtering system 106 accesses a relevant subset of unstructured data 1040 from the unstructured data subset 1014 of the offline data management 1002. In particular, the hybrid query filtering system 106 determines the relevant subset of unstructured data 1040 from the initial subset of data 1038 and the unstructured data subset 1014. In one or more embodiments, the hybrid query filtering system 106 utilizes a series of semantic filters (e.g., the semantic operation filter 1042, the similarity semantic filter 1044, and/or the binary semantic filter 1046) to prune the relevant subset of unstructured data 1040 before utilizing a large language model 1048 to generate a summary of requested data 1050. More information regarding generating the relevant subset of unstructured data and generating the summary of requested data 1050 is described in relation to FIGS. 6-7.

Figure 11:
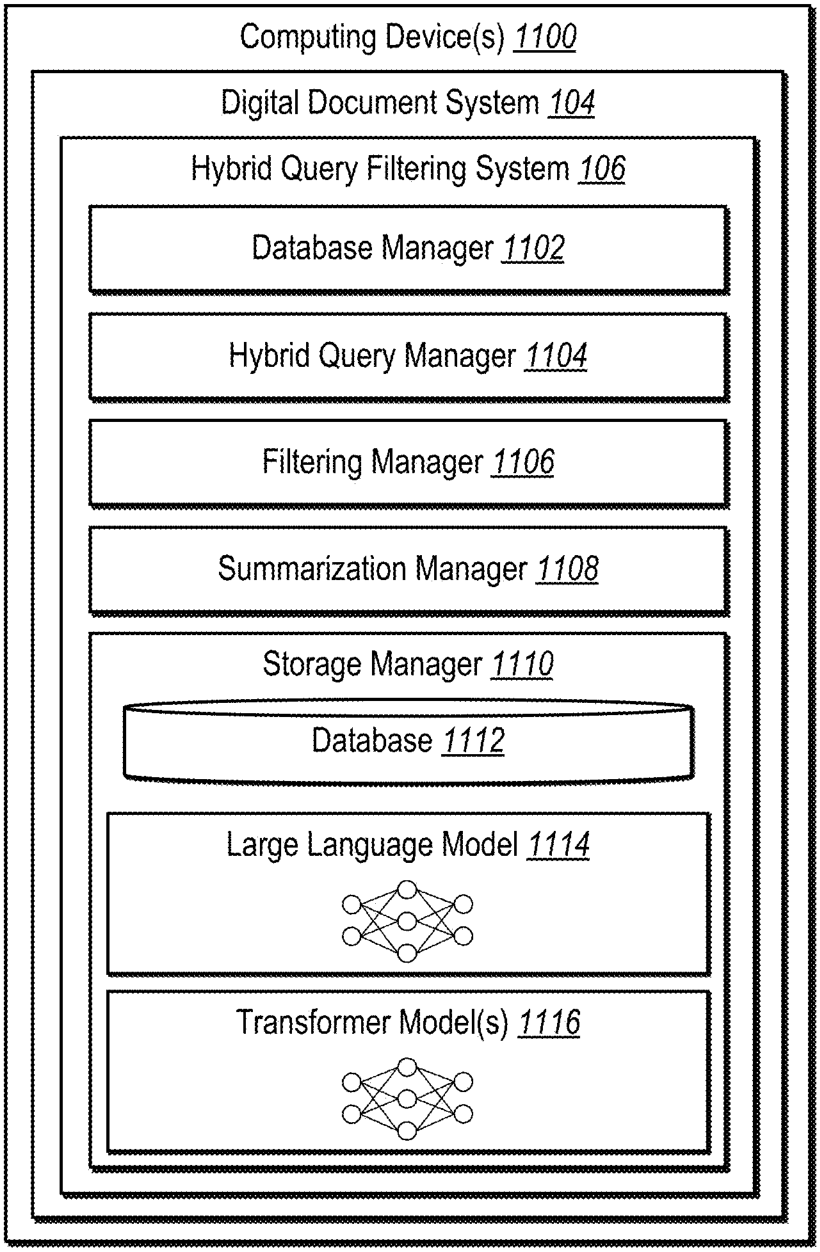
FIG. 11 illustrates an example schematic diagram of a hybrid query filtering system in accordance with one or more embodiments.

Referring now to FIG. 11, additional detail will be provided regarding components and capabilities of the hybrid query filtering system 106. Specifically, FIG. 11 illustrates an example schematic diagram of the hybrid query filtering system 106 on an example computing device(s) 1100 (e.g., one or more of the client device 116 and/or the server device(s) 102). As shown in FIG. 11, the hybrid query filtering system 106 includes a database manager 1102, a hybrid query manager 1104, a filtering manager 1106, a summarization manager 1108, and a storage manager 1110.

As mentioned, the hybrid query filtering system 106 includes a database manager 1102. In particular, the database manager 1102 manages, adjusts, or alters a composite database (e.g., the composite database 302 of FIG. 3). For example, the database manager determines, from the composite database, a set of structured data (e.g., the structured data subset 308 of FIG. 3) and a set of unstructured data (e.g., the unstructured data subset 312 of FIG. 3).

As mentioned, the hybrid query filtering system 106 includes a hybrid query manager 1104. In particular, the hybrid query manager 1104 generates, modifies, alters, or selects a hybrid query (e.g., the hybrid query 412 of FIG. 4). For example, the hybrid query manager 1104 utilizes a hybrid query parser (e.g., the hybrid query parser 410 of FIG. 4) to generate the hybrid query from a prompt (e.g., the prompt 402).

As mentioned, the hybrid query filtering system 106 includes a filtering manager 1106. In particular, the filtering manager 1106 generates, modifies, alters, or selects an actionable subset of data (e.g., the actionable subset of data 620 of FIG. 6). For example, the filtering manager 1106 utilizes a set of semantic filters (e.g., the semantic operation filter 610, the similarity semantic filter 612, and/or the binary semantic filter 616 of FIG. 6) to determine the actionable subset of data.

As mentioned, the hybrid query filtering system 106 includes a summarization manager 1108. In particular, the summarization manager 1108 generates, modifies, alters, or selects a summary of requested data (e.g., the summary of requested data 708 of FIG. 7). For example, the hybrid query filtering system 106 utilizes a large language model (e.g., the large language model 706 of FIG. 7) to generate the summary of requested data from an actionable subset of data (e.g., the actionable subset of data 702 of FIG. 7) and a hybrid query (e.g., the hybrid query 704 of FIG. 7).

The hybrid query filtering system 106 further includes a storage manager 1110. The storage manager 1110 operates in conjunction with the other components of the hybrid query filtering system 106 and includes one or more memory devices such as the database 1112 (e.g., the database 114 of FIG. 1 and/or the composite database 302 of FIG. 3) that stores various data such as composite datasets, prompts, hybrid queries, and summaries of requested data. In some cases, the storage manager also manages or maintains the large language model 1114 and the transformer model(s) 1116 for generating a summary of requested data as described above.

In one or more embodiments, each of the components of the hybrid query filtering system 106 are in communication with one another using any suitable communication technologies. Additionally, the components of the hybrid query filtering system 106 are in communication with one or more other devices including one or more client devices described above. It will be recognized that although the components of the hybrid query filtering system 106 are shown to be separate in FIG. 11, any of the subcomponents may be combined into fewer components, such as into a single component, or divided into more components as may serve a particular implementation. Furthermore, although the components of FIG. 11 are described in connection with the hybrid query filtering system 106, at least some of the components for performing operations in conjunction with the hybrid query filtering system 106 described herein may be implemented on other devices within the environment.

The components of the hybrid query filtering system 106 include software, hardware, or both. For example, the components of the hybrid query filtering system 106 include one or more instructions stored on a computer-readable storage medium and executable by processors of one or more computing devices (e.g., the computing device(s) 1100). When executed by the one or more processors, the computer-executable instructions of the hybrid query filtering system 106 cause the computing device(s) 1100 to perform the methods described herein. Alternatively, the components of the hybrid query filtering system 106 comprise hardware, such as a special purpose processing device to perform a certain function or group of functions. Additionally, or alternatively, the components of the hybrid query filtering system 106 include a combination of computer-executable instructions and hardware.

Furthermore, the components of the hybrid query filtering system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the hybrid query filtering system 106 may be implemented as part of a stand-alone application on a personal computing device or a mobile device. Alternatively, or additionally, the components of the hybrid query filtering system 106 may be implemented in any application that allows creation and delivery of content to users, including, but not limited to, ADOBE® applications such as CAMPAIGN and EXPERIENCE PLATFORM.

FIGS. 1-10, the corresponding text, and the examples provide a number of different systems, methods, and non-transitory computer readable media for generating a target digital design from a description of the target digital design. In addition to the foregoing, embodiments can also be described in terms of flowcharts comprising acts for accomplishing a particular result. For example, FIG. 12 illustrates a flowchart of example sequences or series of acts in accordance with one or more embodiments.

Figure 12:
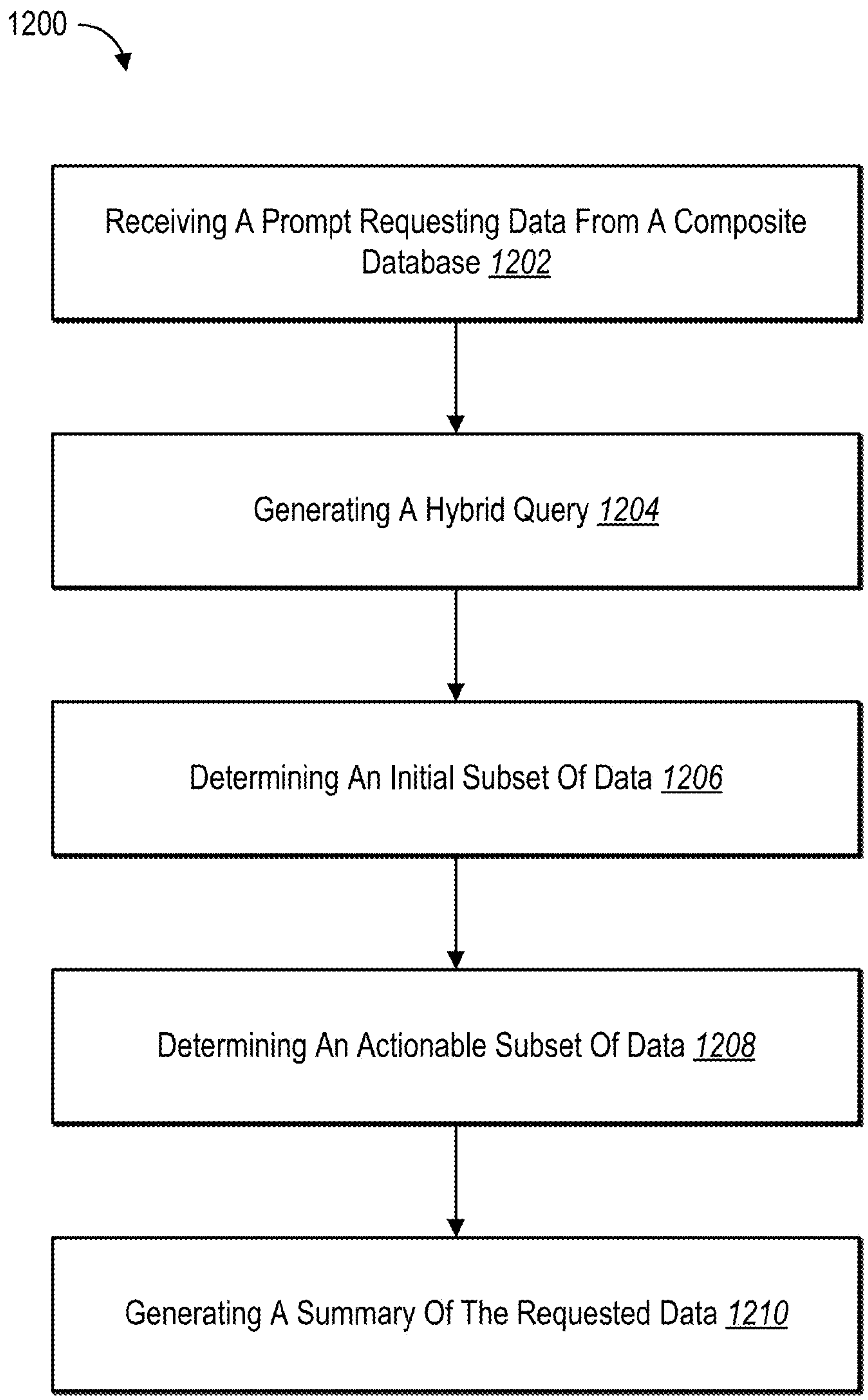
FIG. 12 illustrates an example flowchart of a series of acts for generating a summary of requested data by executing a hybrid query in accordance with one or more embodiments.

While FIG. 12 illustrates acts according to particular embodiments, alternative embodiments may omit, add to, reorder, and/or modify any of the acts shown in FIG. 12. The acts of FIG. 12 can be performed as part of a method. Alternatively, a non-transitory computer readable medium can comprise instructions that, when executed by one or more processors, cause a computing device to perform the acts of FIG. 12. In still further embodiments, a system can perform the acts of FIG. 12. Additionally, the acts described herein may be repeated or performed in parallel with different instances of the same or other similar acts.

FIG. 12 illustrates an example series of acts 1200 for generating a summary of requested data from a composite database. In particular, the series of acts 1200 includes an act 1202 of receiving a prompt requesting data from a composite database. For example, the act 1202 involves receiving, from a client device, a prompt requesting data from a composite database, wherein the composite database includes structured data sources and unstructured data sources. Further, the series of acts 1200 includes an act 1204 of generating a hybrid query. For example, the act 1204 involves generating, from the prompt, a hybrid query comprising one or more structured subqueries and one or more unstructured semantic subqueries. Further, the series of acts 1200 includes an act 1206 of determining an initial subset of data. For example, the act 1206 involves determining an initial subset of data within the composite database by executing the one or more structured subqueries on the structured data sources of the composite database. Further, the series of acts 1200 includes an act 1208 of determining an actionable subset of data. For example, the act 1208 involves determining an actionable subset of data from the initial subset of data by utilizing a set of semantic filters to analyze the unstructured data sources of the initial subset of data according to the one or more unstructured semantic subqueries of the hybrid query. Further, the series of acts 1200 includes an act 1210 of generating a summary of the requested data. For example, the act 1210 involves generating, by utilizing a large language model to analyze the actionable subset of data, a summary of the requested data for display on a graphical user interface of the client device in response to the prompt.

In some embodiments, the series of acts 1200 includes determining a structured data subset comprising structured data sources. The series of acts 1200 also includes determining, by utilizing a transformer model, an unstructured data subset comprising unstructured data sources. The series of acts 1200 also includes determining, by utilizing a scope detection formatting filter, that the prompt satisfies a relevance threshold associated with the composite database. The series of acts 1200 also includes identifying, by utilizing a data schema formatting filter, a data schema corresponding to the requested data of the prompt. The series of acts 1200 also includes identifying, by utilizing an example formatting detection filter, an example hybrid query format corresponding to the prompt. The series of acts 1200 also includes generating, by utilizing a hybrid query parser, the hybrid query according to the data schema and the example hybrid query format.

In some embodiments, the series of acts 1200 includes determining, by utilizing the hybrid query parser to decompose the prompt, one or more subprompts requesting a discrete data type. The series of acts 1200 also includes identifying, by utilizing the hybrid query parser, the one or more subprompts as: structured subprompts requesting a discrete data type corresponding to the structured data sources; or unstructured subprompts requesting a discrete data type corresponding to the unstructured data sources. The series of acts 1200 also includes generating, by utilizing the hybrid query parser, the one or more structured subqueries from the structured subprompts. The series of acts 1200 also includes generating, by utilizing the hybrid query parser, the one or more unstructured semantic subqueries from the unstructured subprompts. The series of acts 1200 also includes determining, for an unstructured subprompt, a semantic operator. The series of acts 1200 also includes generating, from the unstructured subprompt, an unstructured semantic subquery according to the semantic operator.

In some embodiments, the series of acts 1200 includes identifying, by utilizing a retrieval model, the unstructured data sources from the composite database. The series of acts 1200 also includes executing the set of semantic filters on the unstructured data sources to determine the actionable subset of data from the unstructured data sources. The series of acts 1200 also includes determining one or more semantic operations to perform corresponding to the one or more unstructured semantic subqueries. The series of acts 1200 also includes determining, by comparing a vector representation of the prompt to vector representations of data sources within the initial subset of data to determine sentence-level similarity scores, relevant data within the initial subset of data. The series of acts 1200 also includes determining, by utilizing one or more transformer models to enforce a set of binary relevance filters, the actionable subset of data from the relevant data.

In some embodiments, the series of acts 1200 includes determining, utilizing the large language model, the requested data within the actionable subset of data. The series of acts 1200 also includes generating, in response to identifying one or more complex subprompt types within the prompt requesting data and by utilizing the large language model, a natural language prompt corresponding to the actionable subset of data. The series of acts 1200 also includes generating the summary of the requested data by utilizing the large language model to execute the natural language prompt according to the actionable subset of data.

In some embodiments, the series of acts 1200 includes generating, in response to a client device prompt requesting data from a composite database including structured data sources and unstructured data sources, a hybrid query comprising one or more structured subqueries and one or more unstructured semantic subqueries. The series of acts 1200 also includes determining an initial subset of data within the composite database by executing the one or more structured subqueries on the structured data sources of the composite database. The series of acts 1200 also includes determining an actionable subset of data within the initial subset of data by executing a set of semantic filters to analyze the unstructured data sources within the initial subset of data according to the hybrid query, the set of semantic filters comprising one or more of determining one or more semantic operations to perform corresponding to the one or more unstructured semantic subqueries; determining, by utilizing sentence-level similarity scores, relevant data within the initial subset of data; and determining, by utilizing one or more transformer models, the actionable subset of data from the relevant data. The series of acts 1200 also includes generating, by utilizing a large language model to analyze the actionable subset of data, a summary of the requested data.

In some embodiments, the series of acts 1200 includes determining a structured data subset within the composite database comprising structured data sources. The series of acts 1200 also includes determining, by utilizing a transformer model, an unstructured data subset within the composite database comprising unstructured data sources. The series of acts 1200 also includes determining, utilizing a set of formatting filters, a data schema and an example hybrid query format corresponding to the client device prompt. The series of acts 1200 also includes generating, by utilizing a hybrid query parser, the hybrid query according to the data schema and the example hybrid query format.

In some embodiments, the series of acts 1200 includes determining, by utilizing a scope detection formatting filter, that the client device prompt satisfies a relevance threshold associated with the composite database. The series of acts 1200 also includes identifying, by utilizing a data schema formatting filter, the data schema corresponding to the requested data of the client device prompt. The series of acts 1200 also includes identifying, by utilizing an example formatting detection filter, the example hybrid query format corresponding to the client device prompt. The series of acts 1200 also includes generating the summary of the requested data by determining, utilizing the large language model, the requested data within the actionable subset of data.

In some embodiments, the series of acts 1200 includes identifying, by utilizing the large language model, one or more complex subprompt types within the client device prompt requesting data. The series of acts 1200 also includes generating, by utilizing the large language model to analyze the one or more complex subprompt types, a natural language prompt corresponding to the actionable subset of data. The series of acts 1200 also includes generating the summary of the requested data by utilizing the large language model to execute the natural language prompt according to the actionable subset of data.

In some embodiments, the series of acts 1200 includes determining, for a composite database and by utilizing one or more machine learning models, a structured data subset comprising structured data sources and an unstructured data subset comprising unstructured data sources. The series of acts 1200 also includes receiving, from a client device, a prompt requesting data from the composite database. The series of acts 1200 also includes generating, from the prompt, a hybrid query comprising one or more structured subqueries and one or more unstructured semantic subqueries. The series of acts 1200 also includes determining, by executing the one or more structured subqueries of the hybrid query within the structured data subset, an initial subset of data of the composite database. The series of acts 1200 also includes determining, by executing the one or more unstructured semantic subqueries within the unstructured data subset according to a set of semantic filters, an actionable subset of data of the composite database from the initial subset of data. The series of acts 1200 also includes generating, by utilizing a large language model to analyze the actionable subset of data, a summary of the requested data for display on a graphical user interface of the client device in response to the prompt.

In some embodiments, the series of acts 1200 includes determining the structured data subset. The series of acts 1200 also includes determining, by utilizing a transformer model to process unstructured data sources, the unstructured data subset. The series of acts 1200 also includes determining, utilizing a set of formatting filters, a hybrid query format corresponding to the prompt. The series of acts 1200 also includes generating the hybrid query by utilizing a hybrid query parser according to the hybrid query format.

In some embodiments, the series of acts 1200 includes determining, by utilizing the hybrid query parser to decompose the prompt, one or more structured subprompts requesting structured data and one or more unstructured subprompts requesting unstructured data. The series of acts 1200 also includes generating the hybrid query by utilizing the hybrid query parser to generate the one or more structured subqueries from the one or more structured subprompts and to generate the one or more unstructured semantic subqueries from the one or more unstructured subprompts. The series of acts 1200 also includes determining, by executing a first semantic filter, one or more semantic operations corresponding to the one or more unstructured semantic subqueries. The series of acts 1200 also includes determining, by executing a second semantic filter, relevant data within the initial subset of data according to sentence-level similarity scores. The series of acts 1200 also includes determining, by executing a third semantic filter to enforce a set of binary relevance filters, the actionable subset of data from the relevant data.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media. Non-transitory computer-readable storage media (devices) includes optical and/or non-optical memory, disks, or caches that store computer data interpretable by one or more processors to execute particular functions as described herein. A "network" is defined as one or more data links that enable the transport of electronic data between computer systems and/or modules and/or other electronic devices. Information is transferred or provided over a network (either hardwired, wireless, or a combination of hardwired or wireless) to a computer to carry program code in the form of computer-executable instructions or data structures and which can be accessed by a general purpose or special purpose computer.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Embodiments of the present disclosure can also be implemented in cloud computing environments. In this description, "cloud computing" is defined as a model for enabling on-demand network access to a shared pool of configurable computing resources. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth.

Figure 13:
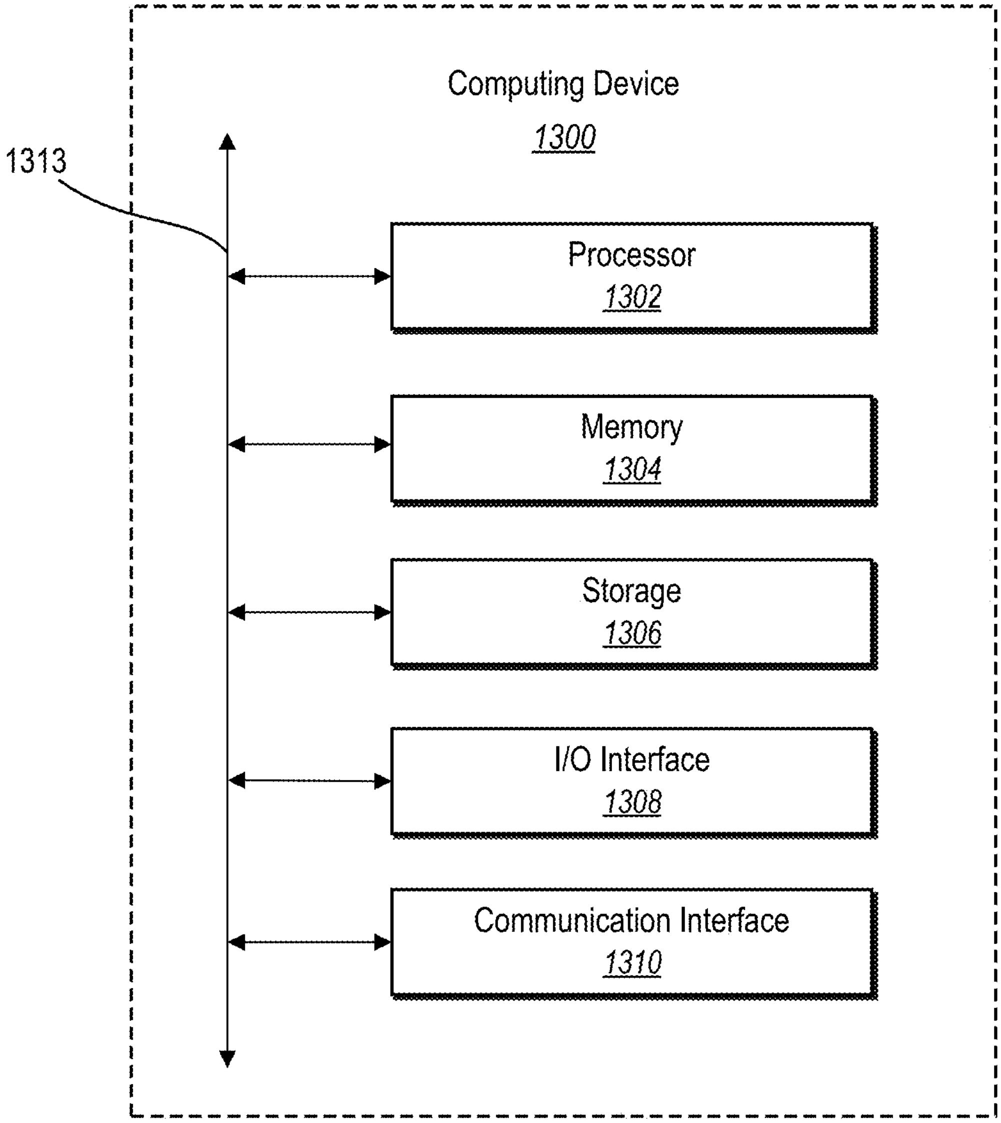
FIG. 13 illustrates a block diagram of an example computing device in accordance with one or more embodiments.

FIG. 13 illustrates, in block diagram form, an example computing device 1300 (e.g., the computing device(s) 1100, the client device 116, and/or the server device(s) 102) that may be configured to perform one or more of the processes described above. As shown by FIG. 13, the computing device can comprise a processor(s) 1302, memory 1304, a storage device 1306, an I/O interface 1308, and a communication interface 1310.

In particular embodiments, processor(s) 1302 includes hardware for executing instructions, such as those making up a computer program. As an example, and not by way of limitation, to execute instructions, processor(s) 1302 may retrieve (or fetch) the instructions from an internal register, an internal cache, memory 1304, or a storage device 1306 and decode and execute them. The computing device 1300 includes memory 1304, which is coupled to the processor(s) 1302. The memory 1304 may be used for storing data, metadata, and programs for execution by the processor(s). The memory 1304 may include one or more of volatile and non-volatile memories. The memory 1304 may be internal or distributed memory. The computing device 1300 includes a storage device 1306 includes storage for storing data or instructions. As an example, and not by way of limitation, storage device 1306 can comprise a non-transitory storage medium described above. The computing device 1300 also includes one or more input or output ("I/O") devices/interfaces 1308, which are provided to allow a user to provide input to (such as user strokes), receive output from, and otherwise transfer data to and from the computing device 1300. These I/O devices/interfaces 1308 may include a mouse, keypad or a keyboard, a touch screen, camera, optical scanner, network interface, modem, other known I/O devices or a combination of such I/O devices/interfaces 1308.

The computing device 1300 can further include a communication interface 1310. The communication interface 1310 can include hardware, software, or both. The communication interface 1310 can provide one or more interfaces for communication (such as, for example, packet-based communication) between the computing device and one or more other computing devices (e.g., computing device 1300) or one or more networks. The computing device 1300 can further include a bus 1313. The bus 1313 can comprise hardware, software, or both that couples components of computing device 1300 to each other.

What is claimed is:

1. A computer-implemented method comprising:

receiving, from a client device, a prompt requesting data from a composite database, wherein the composite database includes structured data sources and unstructured data sources;

generating, from the prompt, a hybrid query comprising one or more structured subqueries and one or more unstructured semantic subqueries;

determining an initial subset of data within the composite database by executing the one or more structured subqueries on the structured data sources of the composite database;

determining an actionable subset of data from the initial subset of data by utilizing a set of semantic filters to analyze the unstructured data sources of the initial subset of data according to the one or more unstructured semantic subqueries of the hybrid query; and generating, by utilizing a large language model to analyze the actionable subset of data, a summary of the requested data for display on a graphical user interface of the client device in response to the prompt.

2. The computer-implemented method of claim 1, further comprising:

determining a structured data subset comprising structured data sources; and determining, by utilizing a transformer model, an unstructured data subset comprising unstructured data sources.

3. The computer-implemented method of claim 1, wherein generating the hybrid query comprises:

determining, by utilizing a scope detection formatting filter, that the prompt satisfies a relevance threshold associated with the composite database;

identifying, by utilizing a data schema formatting filter, a data schema corresponding to the requested data of the prompt;

identifying, by utilizing an example formatting detection filter, an example hybrid query format corresponding to the prompt; and generating, by utilizing a hybrid query parser, the hybrid query according to the data schema and the example hybrid query format.

4. The computer-implemented method of claim 3, wherein generating the hybrid query comprises:

determining, by utilizing the hybrid query parser to decompose the prompt, one or more subprompts requesting a discrete data type;

identifying, by utilizing the hybrid query parser, the one or more subprompts as:

structured subprompts requesting a discrete data type corresponding to the structured data sources; or unstructured subprompts requesting a discrete data type corresponding to the unstructured data sources;

generating, by utilizing the hybrid query parser, the one or more structured subqueries from the structured subprompts; and generating, by utilizing the hybrid query parser, the one or more unstructured semantic subqueries from the unstructured subprompts.

5. The computer-implemented method of claim 4, wherein generating the one or more unstructured semantic subqueries comprises:

determining, for an unstructured subprompt, a semantic operator; and generating, from the unstructured subprompt, an unstructured semantic subquery according to the semantic operator.

6. The computer-implemented method of claim 1, wherein determining the actionable subset of data comprises:

identifying, by utilizing a retrieval model, the unstructured data sources from the composite database; and executing the set of semantic filters on the unstructured data sources to determine the actionable subset of data from the unstructured data sources.

7. The computer-implemented method of claim 6, wherein executing the set of semantic filters comprises:

determining one or more semantic operations to perform corresponding to the one or more unstructured semantic subqueries;

determining, by comparing a vector representation of the prompt to vector representations of data sources within the initial subset of data to determine sentence-level similarity scores, relevant data within the initial subset of data; and determining, by utilizing one or more transformer models to enforce a set of binary relevance filters, the actionable subset of data from the relevant data.

8. The computer-implemented method of claim 1, wherein generating the summary of the requested data comprises determining, utilizing the large language model, the requested data within the actionable subset of data.

9. The computer-implemented method of claim 1, further comprising:

generating, in response to identifying one or more complex subprompt types within the prompt requesting data and by utilizing the large language model, a natural language prompt corresponding to the actionable subset of data; and generating the summary of the requested data by utilizing the large language model to execute the natural language prompt according to the actionable subset of data.

10. A non-transitory computer readable medium storing executable instructions which, when executed by a processing device, cause the processing device to perform operations comprising:

generating, in response to a client device prompt requesting data from a composite database including structured data sources and unstructured data sources, a hybrid query comprising one or more structured subqueries and one or more unstructured semantic subqueries;

determining an initial subset of data within the composite database by executing the one or more structured subqueries on the structured data sources of the composite database;

determining an actionable subset of data within the initial subset of data by executing a set of semantic filters to analyze the unstructured data sources within the initial subset of data according to the hybrid query, the set of semantic filters comprising one or more of:

determining one or more semantic operations to perform corresponding to the one or more unstructured semantic subqueries;

determining, by utilizing sentence-level similarity scores, relevant data within the initial subset of data; and determining, by utilizing one or more transformer models, the actionable subset of data from the relevant data; and generating, by utilizing a large language model to analyze the actionable subset of data, a summary of the requested data.

11. The non-transitory computer readable medium of claim 10, wherein the operations further comprise:

determining a structured data subset within the composite database comprising structured data sources; and determining, by utilizing a transformer model, an unstructured data subset within the composite database comprising unstructured data sources.

12. The non-transitory computer readable medium of claim 10, wherein the operations further comprise generating the hybrid query by:

determining, utilizing a set of formatting filters, a data schema and an example hybrid query format corresponding to the client device prompt; and generating, by utilizing a hybrid query parser, the hybrid query according to the data schema and the example hybrid query format.

13. The non-transitory computer readable medium of claim 12, wherein the operations further comprise determining the data schema and the example hybrid query format by:

determining, by utilizing a scope detection formatting filter, that the client device prompt satisfies a relevance threshold associated with the composite database;

identifying, by utilizing a data schema formatting filter, the data schema corresponding to the requested data of the client device prompt; and identifying, by utilizing an example formatting detection filter, the example hybrid query format corresponding to the client device prompt.

14. The non-transitory computer readable medium of claim 10, wherein the operations further comprise generating the summary of the requested data by determining, utilizing the large language model, the requested data within the actionable subset of data.

15. The non-transitory computer readable medium of claim 10, wherein the operations further comprise:

identifying, by utilizing the large language model, one or more complex subprompt types within the client device prompt requesting data;

generating, by utilizing the large language model to analyze the one or more complex subprompt types, a natural language prompt corresponding to the actionable subset of data; and generating the summary of the requested data by utilizing the large language model to execute the natural language prompt according to the actionable subset of data.

16. A system comprising:

one or more memory devices; and one or more processors configured to cause the system to:

determine, for a composite database and by utilizing one or more machine learning models, a structured data subset comprising structured data sources and an unstructured data subset comprising unstructured data sources;

receive, from a client device, a prompt requesting data from the composite database;

generate, from the prompt, a hybrid query comprising one or more structured subqueries and one or more unstructured semantic subqueries;

determine, by executing the one or more structured subqueries of the hybrid query within the structured data subset, an initial subset of data of the composite database;

determine, by executing the one or more unstructured semantic subqueries within the unstructured data subset according to a set of semantic filters, an actionable subset of data of the composite database from the initial subset of data; and generate, by utilizing a large language model to analyze the actionable subset of data, a summary of the requested data for display on a graphical user interface of the client device in response to the prompt.

17. The system of claim 16, wherein the one or more processors are further configured to cause the system to generate the structured data subset and the unstructured data subset by:

determining the structured data subset; and determining, by utilizing a transformer model to process unstructured data sources, the unstructured data subset.

18. The system of claim 16, wherein the one or more processors are further configured to cause the system to generate the hybrid query by:

determining, utilizing a set of formatting filters, a hybrid query format corresponding to the prompt; and generating the hybrid query by utilizing a hybrid query parser according to the hybrid query format.

19. The system of claim 18, wherein the one or more processors are further configured to generate the hybrid query by:

determining, by utilizing the hybrid query parser to decompose the prompt, one or more structured subprompts requesting structured data and one or more unstructured subprompts requesting unstructured data; and generating the hybrid query by utilizing the hybrid query parser to generate the one or more structured subqueries from the one or more structured subprompts and to generate the one or more unstructured semantic subqueries from the one or more unstructured subprompts.

20. The system of claim 16, wherein the one or more processors are further configured to determine the actionable subset of data by:

determining, by executing a first semantic filter, one or more semantic operations corresponding to the one or more unstructured semantic subqueries;

determining, by executing a second semantic filter, relevant data within the initial subset of data according to sentence-level similarity scores; and determining, by executing a third semantic filter to enforce a set of binary relevance filters, the actionable subset of data from the relevant data.

* * * * *